(12) United States Patent
Katagiri et al.

(10) Patent No.: US 8,687,655 B2
(45) Date of Patent: Apr. 1, 2014

(54) SIGNAL DEMULTIPLEXER, SIGNAL MULTIPLEXER, AND SIGNAL MULTIPLEXER/DEMULTIPLEXER

(75) Inventors: Toru Katagiri, Kawasaki (JP); Masahiro Shioda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 201 days.

(21) Appl. No.: 13/400,827

(22) Filed: Feb. 21, 2012

(65) Prior Publication Data
US 2012/0230350 A1   Sep. 13, 2012

(30) Foreign Application Priority Data

Mar. 11, 2011   (JP) .................................. 2011-054619

(51) Int. Cl.
*H04J 3/24* (2006.01)

(52) U.S. Cl.
USPC ......................................................... 370/474

(58) Field of Classification Search
USPC .......................................... 370/300, 474, 352
See application file for complete search history.

(56) References Cited

U.S. PATENT DOCUMENTS

| | | | | |
|---|---|---|---|---|
| 4,942,574 A * | 7/1990 | Zelle | .............. | 370/400 |
| 4,958,341 A * | 9/1990 | Hemmady et al. | ............ | 370/352 |
| 6,549,527 B1 * | 4/2003 | Tsutsui et al. | ................ | 370/342 |
| 2001/0053161 A1 * | 12/2001 | Tomizawa et al. | ............ | 370/538 |
| 2002/0063924 A1 * | 5/2002 | Kimbrough et al. | .......... | 359/125 |
| 2002/0136207 A1 * | 9/2002 | Matsumoto et al. | .......... | 370/352 |
| 2003/0039251 A1 * | 2/2003 | Hara et al. | .................. | 370/395.1 |
| 2003/0147585 A1 * | 8/2003 | Kikuchi et al. | .................. | 385/24 |
| 2004/0090995 A1 * | 5/2004 | Kang et al. | ..................... | 370/535 |
| 2005/0123236 A1 * | 6/2005 | Ko et al. | .......................... | 385/24 |
| 2008/0019463 A1 * | 1/2008 | Ikeuchi et al. | ................. | 375/331 |
| 2010/0202578 A1 * | 8/2010 | Tomita et al. | ................. | 375/371 |
| 2011/0206150 A1 * | 8/2011 | Lakkis | .......................... | 375/260 |

FOREIGN PATENT DOCUMENTS

| | | |
|---|---|---|
| JP | 3-208428 | 9/1991 |
| JP | 4-258043 | 9/1992 |
| JP | 2008-182540 | 8/2008 |

* cited by examiner

*Primary Examiner* — Asad Nawaz
*Assistant Examiner* — Syed S Ali
(74) *Attorney, Agent, or Firm* — Fujitsu Patent Center

(57) ABSTRACT

A signal demultiplexer includes a conversion unit that converts a format of a high speed signal transfer frame output from a terminating unit into a format of a converted frame; a parallelization unit that parallelizes the converted frame and outputs a predetermined number of data columns; and a separating unit that separates plural low speed signal transfer frames from the predetermined number of the data columns. The conversion unit converts the format of the high speed signal transfer frame into the format of the converted frame by delaying a signal storing area using first and second overhead areas, to include an "i" th tributary slot among the predetermined number of the tributary slots assigned to the signal storing area into an arbitrary "i" th data column among the predetermined number of the data columns, and to align front positions of the predetermined number of the data columns.

7 Claims, 41 Drawing Sheets

FIG.1A

FIG.1B k = 3, OTUk FRAME (1.25G Tributary slot)

| | 1 | ... | 16 | 17 | 18 | ... | 48 | 49 | 50 | ... | 3793 | ... | 3824 | 3825 | ... | 4080 |
|---|---|---|---|---|---|---|---|---|---|---|---|---|---|---|---|---|
| 1 | OH | ... | OH | TS#1 | TS#2 | ... | TS#32 | TS#1 | TS#2 | ... | TS#1 | ... | TS#32 | FEC | ... | FEC |
| 2 | OH | ... | OH | TS#1 | TS#2 | ... | TS#32 | TS#1 | TS#2 | ... | TS#1 | ... | TS#32 | FEC | ... | FEC |
| 3 | OH | ... | OH | TS#1 | TS#2 | ... | TS#32 | TS#1 | TS#2 | ... | TS#1 | ... | TS#32 | FEC | ... | FEC |
| 4 | OH | ... | OH | TS#1 | TS#2 | ... | TS#32 | TS#1 | TS#2 | ... | TS#1 | ... | TS#32 | FEC | ... | FEC | k = 4, OTUk FRAME (1.25G Tributary Slot)

| | 1 | ... | 16 | 17 | 18 | ... | 96 | 97 | 98 | ... | 3777 | ... | 3816 | 3817 | ... | 3824 | 3825 | ... | 4080 |
|---|---|---|---|---|---|---|---|---|---|---|---|---|---|---|---|---|---|---|---|
| 1 | OH | ... | OH | TS#1 | TS#2 | ... | TS#80 | TS#1 | TS#2 | ... | TS#1 | ... | TS#40 | FS | ... | FS | FEC | ... | FEC |
| 2 | OH | ... | OH | TS#41 | TS#42 | ... | TS#40 | TS#41 | TS#42 | ... | TS#41 | ... | TS#80 | FS | ... | FS | FEC | ... | FEC |
| 3 | OH | ... | OH | TS#1 | TS#2 | ... | TS#80 | TS#1 | TS#2 | ... | TS#1 | ... | TS#40 | FS | ... | FS | FEC | ... | FEC |
| 4 | OH | ... | OH | TS#41 | TS#42 | ... | TS#40 | TS#41 | TS#42 | ... | TS#41 | ... | TS#80 | FS | ... | FS | FEC | ... | FEC |

OPUk payload area

FIG.2 k = 2, OTUk FRAME (2.5G Tributary slot)

|   | 1 | ... | 16 | 17 | 18 | 19 | 20 | 21 | 22 | ... | 3821 | ... | 3824 | 3825 | ... | 4080 |
|---|---|---|---|---|---|---|---|---|---|---|---|---|---|---|---|---|
| 1 | OH | ... | OH | TS#1 | TS#2 | TS#3 | TS#4 | TS#1 | TS#2 | ... | TS#1 | ... | TS#4 | FEC | ... | FEC |
| 2 | OH | ... | OH | TS#1 | TS#2 | TS#3 | TS#4 | TS#1 | TS#2 | ... | TS#1 | ... | TS#4 | FEC | ... | FEC |
| 3 | OH | ... | OH | TS#1 | TS#2 | TS#3 | TS#4 | TS#1 | TS#2 | ... | TS#1 | ... | TS#4 | FEC | ... | FEC |
| 4 | OH | ... | OH | TS#1 | TS#2 | TS#3 | TS#4 | TS#1 | TS#2 | ... | TS#1 | ... | TS#4 | FEC | ... | FEC | k = 3, OTUk FRAME (2.5G Tributary slot)

|   | 1 | ... | 16 | 17 | 18 | ... | 31 | 32 | 33 | ... | 3809 | ... | 3824 | 3825 | ... | 4080 |
|---|---|---|---|---|---|---|---|---|---|---|---|---|---|---|---|---|
| 1 | OH | ... | OH | TS#1 | TS#2 | ... | TS#15 | TS#16 | TS#1 | ... | TS#1 | ... | TS#16 | FEC | ... | FEC |
| 2 | OH | ... | OH | TS#1 | TS#2 | ... | TS#15 | TS#16 | TS#1 | ... | TS#1 | ... | TS#16 | FEC | ... | FEC |
| 3 | OH | ... | OH | TS#1 | TS#2 | ... | TS#15 | TS#16 | TS#1 | ... | TS#1 | ... | TS#16 | FEC | ... | FEC |
| 4 | OH | ... | OH | TS#1 | TS#2 | ... | TS#15 | TS#16 | TS#1 | ... | TS#1 | ... | TS#16 | FEC | ... | FEC |

OPUk payload area

FIG.5

| TS BANDWIDTH | | HO_ODUk (HIGH SPEED SIGNALS) | | | | | | | |
|---|---|---|---|---|---|---|---|---|---|
| | | 1.25G TS | | | | 2.5G TS | | | |
| | ODUk | ODU1 | ODU2 | ODU3 | ODU4 | ODU1 | ODU2 | ODU3 | ODU4 |
| TOTAL NO. OF TS | | 2 | 8 | 32 | 80 | — | 4 | 16 | — |
| ODUj (LOW SPEED SIGNALS) | ODU0 | AMP (M=1) | GMP (M=1) | GMP (M=1) | GMP (M=1) | — | — | — | — |
| | ODU1 | — | AMP (M=2) | AMP (M=2) | GMP (M=2) | — | AMP (M=1) | AMP (M=1) | — |
| | ODU2 | — | — | GMP (M=8) | GMP (M=8) | — | — | AMP (M=4) | — |
| | ODU2e | — | — | GMP (M=9) | GMP (M=8) | — | — | — | — |
| | ODU3 | — | — | — | GMP (M=31) | — | — | — | — |
| | ODUflex | — | GMP (M=t2) | GMP (M=t3) | GMP (M=t4) | — | — | — | — |

HERE, t2 = 1···8, t3 = 1···32, t4 = 1···80

FIG.6

| | AMP METHOD | GMP METHOD |
|---|---|---|
| DATA INSERTION POSITION | OPU payload area + OPU OH PART (FOR PJO) | OPU payload area |
| ALLOCATION OF tributary slots IN HIGH SPEED SIGNALS | DIFFERENT FOR EACH HO ODU1 FRAME (ts NUMBER ASSIGNED TO NJO byte PART IN EACH FRAME DIFFERS BETWEEN #01 THROUGH #ts) | FIXED |
| STUFF INSERTION POSITION | STUFF POSITION IS FIXED | CHANGES DEPENDING ON STUFF AMOUNT |
| UNIT OF MULTIPLEX/DEMULTI PLEX PROCESSING (STUFF/DATA INSERTION PROCESSING) | IN UNITS OF 1 byte | IN UNITS OF M bytes (M IS NUMBER OF TS OCCUPIED WHEN STORING ODUj INTO tributary slots (TS) OF HO_ODUk) |
| STUFF AMOUNT OF 1 TS | −1, 0, +1, +2 byte | 0 ~ 15232 bytes (for OTU2, 3)<br>0 ~ 15200 byte (for OTU4) |
| JC byte PROCESSING | STUFF PROCESSING IS PERFORMED IN SAME FRAME AS JC BYTE INFORMATION | STUFF PROCESSING IS PERFORMED WITH JC BYTE INFORMATION IN ONE (MULTI) PRECEDING FRAME |

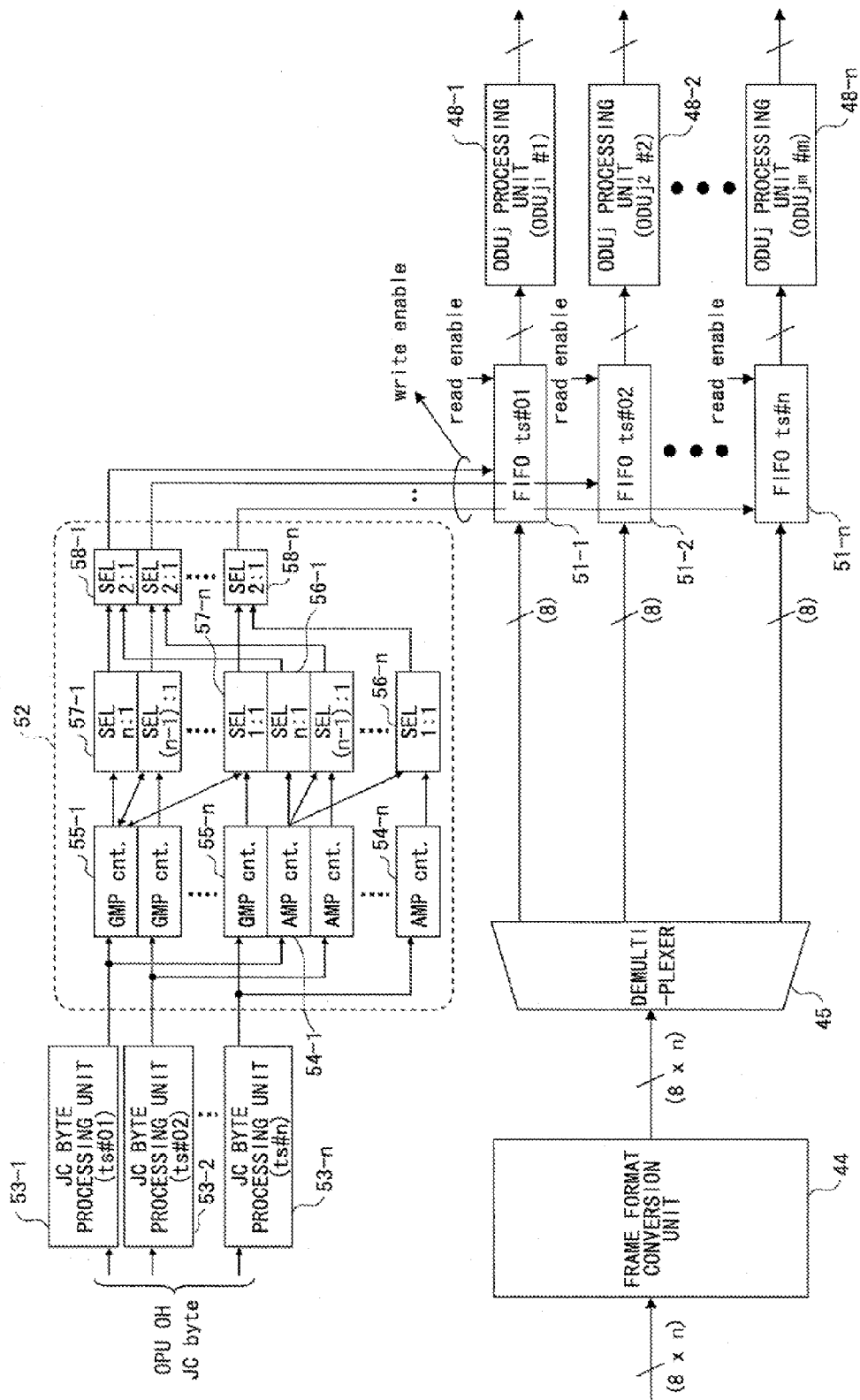

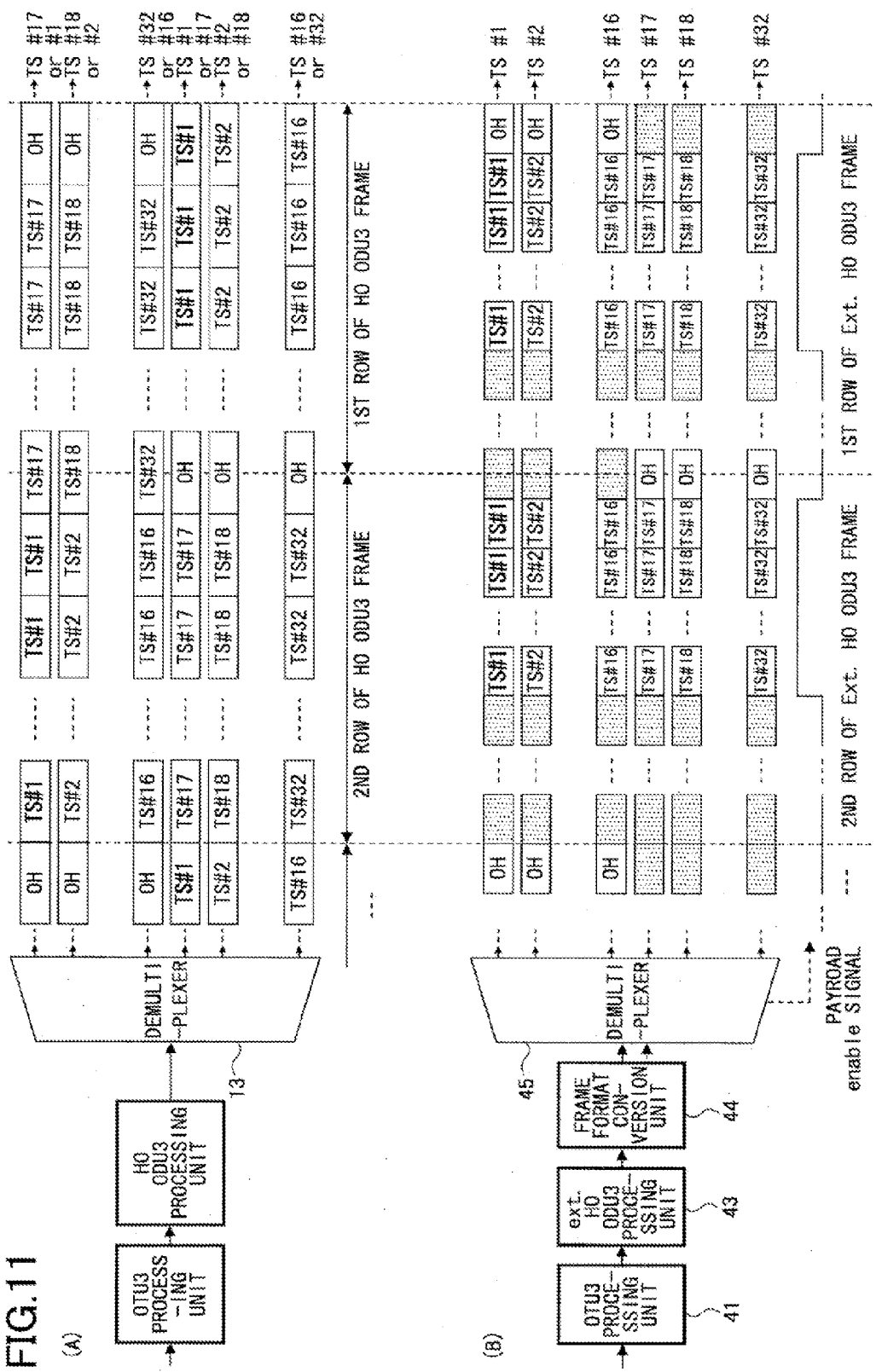

FIG.12B

| 25 | 26 | 27 | 28 | 29 | 30 | 31 | 32 |
|---|---|---|---|---|---|---|---|
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |
| TS #01 | TS #02 | TS #03 | TS #04 | TS #05 | TS #06 | TS #07 | TS #08 |

FIG.12C

| | 33 | 34 | 35 | 36 | 37 | 38 | 39 | 40 | 41 | 42 |
|---|---|---|---|---|---|---|---|---|---|---|
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |
| | TS #01 | TS #02 | TS #03 | TS #04 | TS #05 | TS #06 | TS #07 | TS #08 | TS #01 | TS #02 |

FIG.12D

| 43 | 44 | 45 | 46 | 47 | 48 | 49 | | 3823 | 3824 |
|---|---|---|---|---|---|---|---|---|---|
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | ... | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | ... | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | ... | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | ... | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | ... | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | ... | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | ... | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | ... | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |

| MFAS | 1 | 2 | | 15 | 16 | 17 | 18 | 19 | 20 | 21 |
|---|---|---|---|---|---|---|---|---|---|---|
| 0 0 0 | FAS | FAS | ... | RES | JC | | | | | |
| | OH | OH | ... | RES | JC | | | | | |
| | OH | OH | | RES | JC | | | | | |
| | OH | OH | | PSI | NJO | | | | | |
| 0 0 1 | FAS | FAS | | RES | JC | | | | | |
| | OH | OH | ... | RES | JC | | | | | |
| | OH | OH | | RES | JC | | | | | |
| | OH | OH | | PSI | NJO | | | | | |
| 0 1 0 | FAS | FAS | | JC4 | JC1 | | | | | |
| | OH | OH | ... | JC5 | JC2 | | | | | |
| | OH | OH | | JC6 | JC3 | | | | | |
| | OH | OH | | PSI | RES | | | | | |
| 0 1 1 | FAS | FAS | | RES | JC | | | | | |
| | OH | OH | ... | RES | JC | | | | | |
| | OH | OH | | RES | JC | | | | | |
| | OH | OH | | PSI | NJO | | | | | |
| 1 0 0 | FAS | FAS | | JC4 | JC1 | | | | | |
| | OH | OH | ... | JC5 | JC2 | | | | | |
| | OH | OH | | JC6 | JC3 | | | | | |
| | OH | OH | | PSI | RES | | | | | |
| 1 0 1 | FAS | FAS | | RES | JC | | | | | |
| | OH | OH | ... | RES | JC | | | | | |
| | OH | OH | | RES | JC | | | | | |
| | OH | OH | | PSI | NJO | | | | | |
| 1 1 0 | FAS | FAS | | RES | JC | | | | | |
| | OH | OH | ... | RES | JC | | | | | |
| | OH | OH | | RES | JC | | | | | |
| | OH | OH | | PSI | NJO | | | | | |
| 1 1 1 | FAS | FAS | | RES | JC | | | | | |
| | OH | OH | ... | RES | JC | | | | | |
| | OH | OH | | RES | JC | | | | | |
| | OH | OH | | PSI | NJO | | | | | |

SECURE GAPS OF (2 × ts) BYTES/ROW

FIG.13C

| 33 | 34 | 35 | 36 | 37 | 38 | 39 | 40 | 41 | 42 |
|---|---|---|---|---|---|---|---|---|---|
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| PJO1 | PJO2 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| PJO1 | PJO2 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | PJO1 | TS #05 | TS #06 | TS #07 | PJO2 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | PJO1 | PJO2 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | PJO1 | PJO2 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | PJO1 | TS #05 | TS #06 | TS #07 | PJO2 | TS #01 | TS #02 |

FIG.13D

| | 43 | 44 | 45 | 46 | 47 | 48 | 49 | | 3823 | 3824 |
|---|---|---|---|---|---|---|---|---|---|---|
| | TS #03 | TS #04 | TS #05 | TS #06 | TS #07 | TS #08 | TS #01 | | TS #07 | TS #08 |
| | TS #03 | TS #04 | TS #05 | TS #06 | TS #07 | TS #08 | TS #01 | ... | TS #07 | TS #08 |
| | TS #03 | TS #04 | TS #05 | TS #06 | TS #07 | TS #08 | TS #01 | | TS #07 | TS #08 |
| | TS #03 | TS #04 | TS #05 | TS #06 | TS #07 | TS #08 | TS #01 | | TS #07 | TS #08 |
| | TS #03 | TS #04 | TS #05 | TS #06 | TS #07 | TS #08 | TS #01 | | TS #07 | TS #08 |
| | TS #03 | TS #04 | TS #05 | TS #06 | TS #07 | TS #08 | TS #01 | ... | TS #07 | TS #08 |
| | TS #03 | TS #04 | TS #05 | TS #06 | TS #07 | TS #08 | TS #01 | | TS #07 | TS #08 |
| | TS #03 | TS #04 | TS #05 | TS #06 | TS #07 | TS #08 | TS #01 | | TS #07 | TS #08 |
| | TS #03 | TS #04 | TS #05 | TS #06 | TS #07 | TS #08 | TS #01 | | TS #07 | TS #08 |
| | TS #03 | TS #04 | TS #05 | TS #06 | TS #07 | TS #08 | TS #01 | ... | TS #07 | TS #08 |
| | TS #03 | TS #04 | TS #05 | TS #06 | TS #07 | TS #08 | TS #01 | | TS #07 | TS #08 |
| | TS #03 | TS #04 | TS #05 | TS #06 | TS #07 | TS #08 | TS #01 | | TS #07 | TS #08 |
| | TS #03 | TS #04 | TS #05 | TS #06 | TS #07 | TS #08 | TS #01 | | TS #07 | TS #08 |
| | TS #03 | TS #04 | TS #05 | TS #06 | TS #07 | TS #08 | TS #01 | ... | TS #07 | TS #08 |
| | TS #03 | TS #04 | TS #05 | TS #06 | TS #07 | TS #08 | TS #01 | | TS #07 | TS #08 |
| | TS #03 | TS #04 | TS #05 | TS #06 | TS #07 | TS #08 | TS #01 | | TS #07 | TS #08 |
| | TS #03 | TS #04 | TS #05 | TS #06 | TS #07 | TS #08 | TS #01 | | TS #07 | TS #08 |
| | TS #03 | TS #04 | TS #05 | TS #06 | TS #07 | TS #08 | TS #01 | ... | TS #07 | TS #08 |
| | TS #03 | TS #04 | TS #05 | TS #06 | TS #07 | TS #08 | TS #01 | | TS #07 | TS #08 |
| | TS #03 | TS #04 | TS #05 | TS #06 | TS #07 | TS #08 | TS #01 | | TS #07 | TS #08 |
| | TS #03 | TS #04 | TS #05 | TS #06 | TS #07 | TS #08 | TS #01 | | TS #07 | TS #08 |
| | TS #03 | TS #04 | TS #05 | TS #06 | TS #07 | TS #08 | TS #01 | ... | TS #07 | TS #08 |
| | TS #03 | TS #04 | TS #05 | TS #06 | TS #07 | TS #08 | TS #01 | | TS #07 | TS #08 |
| | TS #03 | TS #04 | TS #05 | TS #06 | TS #07 | TS #08 | TS #01 | | TS #07 | TS #08 |
| | TS #03 | TS #04 | TS #05 | TS #06 | TS #07 | TS #08 | TS #01 | | TS #07 | TS #08 |
| | TS #03 | TS #04 | TS #05 | TS #06 | TS #07 | TS #08 | TS #01 | ... | TS #07 | TS #08 |
| | TS #03 | TS #04 | TS #05 | TS #06 | TS #07 | TS #08 | TS #01 | | TS #07 | TS #08 |
| | TS #03 | TS #04 | TS #05 | TS #06 | TS #07 | TS #08 | TS #01 | | TS #07 | TS #08 |

FIG.13E

| 3825 | 3826 | 3827 | 3828 | 3829 | 3830 | 3831 | 3832 | 3833 | 3834 |
|---|---|---|---|---|---|---|---|---|---|
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |

FIG.13F

| 3835 | 3836 | 3837 | 3838 | 3839 | 3840 | 3841 | | 4079 | 4080 |
|---|---|---|---|---|---|---|---|---|---|
| TS #03 | TS #04 | TS #05 | TS #06 | TS #07 | TS #08 | | | | |
| TS #03 | TS #04 | TS #05 | TS #06 | TS #07 | TS #08 | | ... | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | ... | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | ... | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | ... | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | ... | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | ... | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | ... | | |
| TS #03 | TS #04 | TS #05 | TS #06 | TS #07 | TS #08 | | | | |
| TS #03 | TS #04 | TS #05 | TS #06 | TS #07 | TS #08 | | | | |

FIG.14A

| MFAS | 1 | 2 | | 15 | 16 | 17 | 18 | 19 | 20 | 21 |
|---|---|---|---|---|---|---|---|---|---|---|
| 0 0 0 | FAS | FAS | ... | RES | JC | RES | RES | RES | RES | RES |
| | OH | OH | | RES | JC | RES | RES | RES | RES | RES |
| | OH | OH | | RES | JC | RES | RES | RES | RES | RES |
| | OH | OH | | PSI | NJO | PSI | PSI | PSI | PSI | PSI |
| 0 0 1 | FAS | FAS | ... | RES | JC | RES | RES | RES | RES | RES |
| | OH | OH | | RES | JC | RES | RES | RES | RES | RES |
| | OH | OH | | RES | JC | RES | RES | RES | RES | RES |
| | OH | OH | | PSI | NJO | PSI | PSI | PSI | PSI | PSI |
| 0 1 0 | FAS | FAS | ... | JC4 | JC1 | JC4 | JC4 | JC4 | JC4 | JC4 |
| | OH | OH | | JC5 | JC2 | JC5 | JC5 | JC5 | JC5 | JC5 |
| | OH | OH | | JC6 | JC3 | JC6 | JC6 | JC6 | JC6 | JC6 |
| | OH | OH | | PSI | RES | PSI | PSI | PSI | PSI | PSI |
| 0 1 1 | FAS | FAS | ... | RES | JC | RES | RES | RES | RES | RES |
| | OH | OH | | RES | JC | RES | RES | RES | RES | RES |
| | OH | OH | | RES | JC | RES | RES | RES | RES | RES |
| | OH | OH | | PSI | NJO | PSI | PSI | PSI | PSI | PSI |
| 1 0 0 | FAS | FAS | ... | JC4 | JC1 | JC4 | JC4 | JC4 | JC4 | JC4 |
| | OH | OH | | JC5 | JC2 | JC5 | JC5 | JC5 | JC5 | JC5 |
| | OH | OH | | JC6 | JC3 | JC6 | JC6 | JC6 | JC6 | JC6 |
| | OH | OH | | PSI | RES | PSI | PSI | PSI | PSI | PSI |
| 1 0 1 | FAS | FAS | ... | RES | JC | RES | RES | RES | RES | RES |
| | OH | OH | | RES | JC | RES | RES | RES | RES | RES |
| | OH | OH | | RES | JC | RES | RES | RES | RES | RES |
| | OH | OH | | PSI | NJO | PSI | PSI | PSI | PSI | PSI |
| 1 1 0 | FAS | FAS | ... | RES | JC | RES | RES | RES | RES | RES |
| | OH | OH | | RES | JC | RES | RES | RES | RES | RES |
| | OH | OH | | RES | JC | RES | RES | RES | RES | RES |
| | OH | OH | | PSI | NJO | PSI | PSI | PSI | PSI | PSI |
| 1 1 1 | FAS | FAS | ... | RES | JC | RES | RES | RES | RES | RES |
| | OH | OH | | RES | JC | RES | RES | RES | RES | RES |
| | OH | OH | | RES | JC | RES | RES | RES | RES | RES |
| | OH | OH | | PSI | NJO | PSI | PSI | PSI | PSI | PSI |

COPY 16TH COLUMN

COPY 15TH COLUMN

| | 22 | 23 | 24 | 25 | 26 | 27 | 28 | 29 | 30 | 31 | 32 |
|---|---|---|---|---|---|---|---|---|---|---|---|
| | RES | RES | RES | JC | JC | JC | JC | JC | JC | JC | JC |
| | RES | RES | RES | JC | JC | JC | JC | JC | JC | JC | JC |
| | RES | RES | RES | JC | JC | JC | JC | JC | JC | JC | JC |
| | PSI | PSI | PSI | NJO | NJO | NJO | NJO | NJO | NJO | NJO | NJO |
| | RES | RES | RES | JC | JC | JC | JC | JC | JC | JC | JC |
| | RES | RES | RES | JC | JC | JC | JC | JC | JC | JC | JC |
| | RES | RES | RES | JC | JC | JC | JC | JC | JC | JC | JC |
| | PSI | PSI | PSI | NJO | NJO | NJO | NJO | NJO | NJO | NJO | NJO |
| | JC4 | JC4 | JC4 | JC1 | JC1 | JC1 | JC1 | JC1 | JC1 | JC1 | JC1 |
| | JC5 | JC5 | JC5 | JC2 | JC2 | JC2 | JC2 | JC2 | JC2 | JC2 | JC2 |
| | JC6 | JC6 | JC6 | JC3 | JC3 | JC3 | JC3 | JC3 | JC3 | JC3 | JC3 |
| | PSI | PSI | PSI | RES | RES | RES | RES | RES | RES | RES | RES |
| | RES | RES | RES | JC | JC | JC | JC | JC | JC | JC | JC |
| | RES | RES | RES | JC | JC | JC | JC | JC | JC | JC | JC |
| | RES | RES | RES | JC | JC | JC | JC | JC | JC | JC | JC |
| | PSI | PSI | PSI | NJO | NJO | NJO | NJO | NJO | NJO | NJO | NJO |
| | JC4 | JC4 | JC4 | JC1 | JC1 | JC1 | JC1 | JC1 | JC1 | JC1 | JC1 |
| | JC5 | JC5 | JC5 | JC2 | JC2 | JC2 | JC2 | JC2 | JC2 | JC2 | JC2 |
| | JC6 | JC6 | JC6 | JC3 | JC3 | JC3 | JC3 | JC3 | JC3 | JC3 | JC3 |
| | PSI | PSI | PSI | RES | RES | RES | RES | RES | RES | RES | RES |
| | RES | RES | RES | JC | JC | JC | JC | JC | JC | JC | JC |
| | RES | RES | RES | JC | JC | JC | JC | JC | JC | JC | JC |
| | RES | RES | RES | JC | JC | JC | JC | JC | JC | JC | JC |
| | PSI | PSI | PSI | NJO | NJO | NJO | NJO | NJO | NJO | NJO | NJO |
| | RES | RES | RES | JC | JC | JC | JC | JC | JC | JC | JC |
| | RES | RES | RES | JC | JC | JC | JC | JC | JC | JC | JC |
| | RES | RES | RES | JC | JC | JC | JC | JC | JC | JC | JC |
| | PSI | PSI | PSI | NJO | NJO | NJO | NJO | NJO | NJO | NJO | NJO |
| | RES | RES | RES | JC | JC | JC | JC | JC | JC | JC | JC |
| | RES | RES | RES | JC | JC | JC | JC | JC | JC | JC | JC |
| | RES | RES | RES | JC | JC | JC | JC | JC | JC | JC | JC |
| | PSI | PSI | PSI | NJO | NJO | NJO | NJO | NJO | NJO | NJO | NJO |

COPY 16TH COLUMN

CONTINUED FROM FIG.14B

FIG.14C

| TS #01 | TS #02 | TS #03 | TS #04 | TS #05 | TS #06 | TS #07 | TS #08 | TS #01 | TS #02 |
|---|---|---|---|---|---|---|---|---|---|
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| PJO1 | PJO2 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| PJO1 | PJO2 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | PJO1 | TS #05 | TS #06 | TS #07 | PJO2 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | PJO1 | PJO2 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | PJO1 | PJO2 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | PJO1 | TS #05 | TS #06 | TS #07 | PJO2 | TS #01 | TS #02 |

FIG.14D

| TS #03 | TS #04 | TS #05 | TS #06 | TS #07 | TS #08 | TS #01 | | TS #07 | TS #08 |
|---|---|---|---|---|---|---|---|---|---|
| TS #03 | TS #04 | TS #05 | TS #06 | TS #07 | TS #08 | TS #01 | ... | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | ... | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | ... | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | ... | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | ... | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | ... | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | ... | TS #07 | TS #08 |
| TS #03 | TS #04 | TS #05 | TS #06 | TS #07 | TS #08 | TS #01 | | TS #07 | TS #08 |
| TS #03 | TS #04 | TS #05 | TS #06 | TS #07 | TS #08 | TS #01 | | TS #07 | TS #08 |

FIG.14E

| 3825 | 3826 | 3827 | 3828 | 3829 | 3830 | 3831 | 3832 | 3833 | 3834 |
|---|---|---|---|---|---|---|---|---|---|
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |
| TS #01 | TS #02 | TS #03 | TS #04 | TS #05 | TS #06 | TS #07 | TS #08 | TS #01 | TS #02 |

FIG.14F

| 3835 | 3836 | 3837 | 3838 | 3839 | 3840 | 3841 | | 4079 | 4080 |
|---|---|---|---|---|---|---|---|---|---|
| TS #03 | TS #04 | TS #05 | TS #06 | TS #07 | TS #08 | | | | |
| TS #03 | TS #04 | TS #05 | TS #06 | TS #07 | TS #08 | | ... | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | ... | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | ... | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | ... | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | ... | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | ... | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | | | |
| TS #03 | TS #04 | TS #05 | TS #06 | TS #07 | TS #08 | | ... | | |
| TS #03 | TS #04 | TS #05 | TS #06 | TS #07 | TS #08 | | | | |
| TS #03 | TS #04 | TS #05 | TS #06 | TS #07 | TS #08 | | | | |

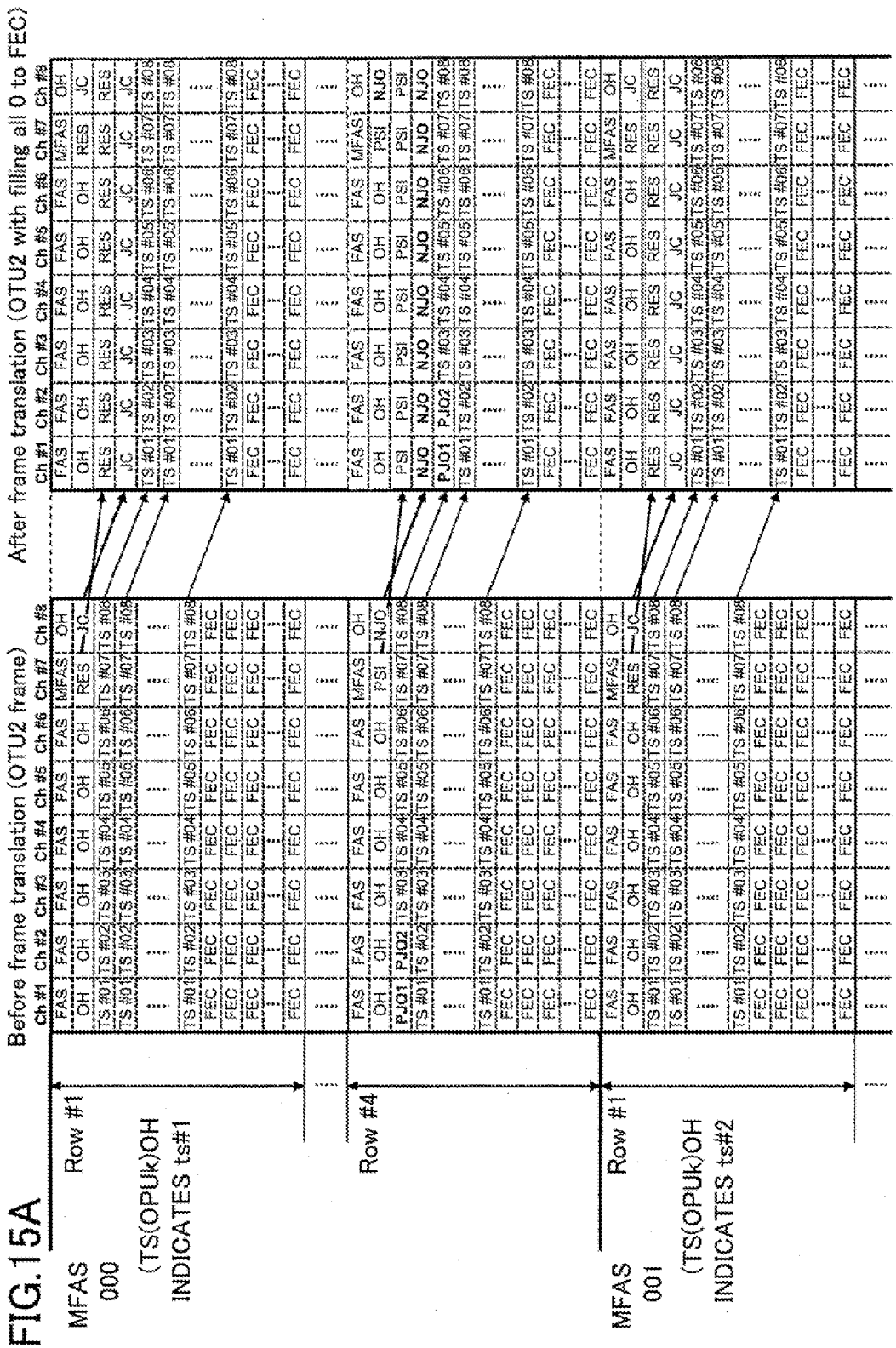

| | ch #1 | ch #2 | ch #3 | ch #4 | ch #5 | ch #6 | ch #7 | ch #8 | ch #9 | ch #10 | ch #11 | ch #12 | ch #13 | ch #14 | ch #15 |
|---|---|---|---|---|---|---|---|---|---|---|---|---|---|---|---|
| Row#1 1 | FAS | FAS | FAS | FAS | FAS | FAS | MFAS | OH | OH | OH | OH | OH | OH | OH | TSOH |
| 2 | #17 | #18 | #19 | #20 | #21 | #22 | #23 | #24 | #25 | #26 | #27 | #28 | #29 | #30 | #31 |
| 3 | #17 | #18 | #19 | #20 | #21 | #22 | #23 | #24 | #25 | #26 | #27 | #28 | #29 | #30 | #31 |
| 4 | #17 | #18 | #19 | #20 | #21 | #22 | #23 | #24 | #25 | #26 | #27 | #28 | #29 | #30 | #31 |
| ... | ... | ... | ... | ... | ... | ... | ... | ... | ... | ... | ... | ... | ... | ... | ... |
| 119 | #17 | #18 | #19 | #20 | #21 | #22 | #23 | #24 | #25 | #26 | #27 | #28 | #29 | #30 | #31 |
| 120 | #17 | #18 | #19 | #20 | #21 | #22 | #23 | #24 | #25 | #26 | #27 | #28 | #29 | #30 | #31 |
| 121 | | | | | | | | | | | | | | | |
| 122 | | | | | | | | | | | | | | | |
| 123 | | | | | | | | | | | | | | | |
| ... | ... | ... | ... | ... | ... | ... | ... | ... | ... | ... | ... | ... | ... | ... | ... |
| 128 | | | | | | | | | | | | | | | |
| Row#2 129 | #1 | #2 | #3 | #4 | #5 | #6 | #7 | #8 | #9 | #10 | #11 | #12 | #13 | #14 | #15 |
| 130 | #1 | #2 | #3 | #4 | #5 | #6 | #7 | #8 | #9 | #10 | #11 | #12 | #13 | #14 | #15 |
| 131 | #1 | #2 | #3 | #4 | #5 | #6 | #7 | #8 | #9 | #10 | #11 | #12 | #13 | #14 | #15 |
| 132 | #1 | #2 | #3 | #4 | #5 | #6 | #7 | #8 | #9 | #10 | #11 | #12 | #13 | #14 | #15 |
| ... | ... | ... | ... | ... | ... | ... | ... | ... | ... | ... | ... | ... | ... | ... | ... |
| 247 | #1 | #2 | #3 | #4 | #5 | #6 | #7 | #8 | #9 | #10 | #11 | #12 | #13 | #14 | #15 |
| 248 | | | | | | | | | | | | | | | |
| 249 | | | | | | | | | | | | | | | |
| 250 | | | | | | | | | | | | | | | |
| ... | ... | ... | ... | ... | ... | ... | ... | ... | ... | ... | ... | ... | ... | ... | ... |
| 255 | | | | | | | | | | | | | | | |
| Row#3 1 | OH | OH | OH | OH | OH | OH | OH | OH | OH | OH | OH | OH | OH | OH | TSOH |
| 2 | #17 | #18 | #19 | #20 | #21 | #22 | #23 | #24 | #25 | #26 | #27 | #28 | #29 | #30 | #31 |
| 3 | #17 | #18 | #19 | #20 | #21 | #22 | #23 | #24 | #25 | #26 | #27 | #28 | #29 | #30 | #31 |
| 4 | #17 | #18 | #19 | #20 | #21 | #22 | #23 | #24 | #25 | #26 | #27 | #28 | #29 | #30 | #31 |
| ... | ... | ... | ... | ... | ... | ... | ... | ... | ... | ... | ... | ... | ... | ... | ... |
| 119 | #17 | #18 | #19 | #20 | #21 | #22 | #23 | #24 | #25 | #26 | #27 | #28 | #29 | #30 | #31 |
| 120 | #17 | #18 | #19 | #20 | #21 | #22 | #23 | #24 | #25 | #26 | #27 | #28 | #29 | #30 | #31 |
| 121 | | | | | | | | | | | | | | | |
| 122 | | | | | | | | | | | | | | | |
| 123 | | | | | | | | | | | | | | | |
| ... | ... | ... | ... | ... | ... | ... | ... | ... | ... | ... | ... | ... | ... | ... | ... |
| 128 | | | | | | | | | | | | | | | |
| Row#4 129 | #1 | #2 | #3 | #4 | #5 | #6 | #7 | #8 | #9 | #10 | #11 | #12 | #13 | #14 | #15 |
| 130 | #1 | #2 | #3 | #4 | #5 | #6 | #7 | #8 | #9 | #10 | #11 | #12 | #13 | #14 | #15 |
| 131 | #1 | #2 | #3 | #4 | #5 | #6 | #7 | #8 | #9 | #10 | #11 | #12 | #13 | #14 | #15 |
| 132 | #1 | #2 | #3 | #4 | #5 | #6 | #7 | #8 | #9 | #10 | #11 | #12 | #13 | #14 | #15 |
| ... | ... | ... | ... | ... | ... | ... | ... | ... | ... | ... | ... | ... | ... | ... | ... |
| 247 | #1 | #2 | #3 | #4 | #5 | #6 | #7 | #8 | #9 | #10 | #11 | #12 | #13 | #14 | #15 |
| 248 | | | | | | | | | | | | | | | |
| 249 | | | | | | | | | | | | | | | |
| 250 | | | | | | | | | | | | | | | |
| ... | ... | ... | ... | ... | ... | ... | ... | ... | ... | ... | ... | ... | ... | ... | ... |
| 255 | | | | | | | | | | | | | | | |
| 1 | FAS | FAS | FAS | FAS | FAS | FAS | MFAS | OH | OH | OH | OH | OH | OH | OH | TSOH |
| 2 | #17 | #18 | #19 | #20 | #21 | #22 | #23 | #24 | #25 | #26 | #27 | #28 | #29 | #30 | #31 |
| 3 | #17 | #18 | #19 | #20 | #21 | #22 | #23 | #24 | #25 | #26 | #27 | #28 | #29 | #30 | #31 |
| 4 | #17 | #18 | #19 | #20 | #21 | #22 | #23 | #24 | #25 | #26 | #27 | #28 | #29 | #30 | #31 |
| ... | ... | ... | ... | ... | ... | ... | ... | ... | ... | ... | ... | ... | ... | ... | ... |

| | ch #1 | ch #2 | ch #3 | ch #4 | ch #5 | ch #6 | ch #7 | ch #8 | ch #9 | ch #10 | ch #11 | ch #12 | ch #13 | ch #14 | ch #15 | ch #16 | ch #17 |
|---|---|---|---|---|---|---|---|---|---|---|---|---|---|---|---|---|---|
| 1 | FAS | FAS | FAS | FAS | FAS | FAS | MFAS | OH | OH | OH | OH | OH | OH | OH | TSOH | TSOH | |
| 2 | TSOH | TSOH | TSOH | TSOH | TSOH | TSOH | TSOH | TSOH | TSOH | TSOH | TSOH | TSOH | TSOH | TSOH | TSOH | TSOH | TSOH |
| 3 | TSOH | TSOH | TSOH | TSOH | TSOH | TSOH | TSOH | TSOH | TSOH | TSOH | TSOH | TSOH | TSOH | TSOH | TSOH | TSOH | TSOH |
| 4 | #1 | #2 | #3 | #4 | #5 | #6 | #7 | #8 | #9 | #10 | #11 | #12 | #13 | #14 | #15 | #16 | #17 |
| 5 | #1 | #2 | #3 | #4 | #5 | #6 | #7 | #8 | #9 | #10 | #11 | #12 | #13 | #14 | #15 | #16 | #17 |
| 6 | #1 | #2 | #3 | #4 | #5 | #6 | #7 | #8 | #9 | #10 | #11 | #12 | #13 | #14 | #15 | #16 | #17 |
| 7 | #1 | #2 | #3 | #4 | #5 | #6 | #7 | #8 | #9 | #10 | #11 | #12 | #13 | #14 | #15 | #16 | #17 |
| ... | ... | ... | ... | ... | ... | ... | ... | ... | ... | ... | ... | ... | ... | ... | ... | ... | ... |
| 122 | #1 | #2 | #3 | #4 | #5 | #6 | #7 | #8 | #9 | #10 | #11 | #12 | #13 | #14 | #15 | #16 | #17 |
| 123 | | | | | | | | | | | | | | | | | |
| ... | ... | ... | ... | ... | ... | ... | ... | ... | ... | ... | ... | ... | ... | ... | ... | ... | ... |
| 128 | | | | | | | | | | | | | | | | | OH |
| 129 | TSOH | TSOH | TSOH | TSOH | TSOH | TSOH | TSOH | TSOH | TSOH | TSOH | TSOH | TSOH | TSOH | TSOH | TSOH | TSOH | TSOH |
| 130 | TSOH | TSOH | TSOH | TSOH | TSOH | TSOH | TSOH | TSOH | TSOH | TSOH | TSOH | TSOH | TSOH | TSOH | TSOH | TSOH | TSOH |
| 131 | #1 | #2 | #3 | #4 | #5 | #6 | #7 | #8 | #9 | #10 | #11 | #12 | #13 | #14 | #15 | #16 | #17 |
| 132 | #1 | #2 | #3 | #4 | #5 | #6 | #7 | #8 | #9 | #10 | #11 | #12 | #13 | #14 | #15 | #16 | #17 |
| 133 | #1 | #2 | #3 | #4 | #5 | #6 | #7 | #8 | #9 | #10 | #11 | #12 | #13 | #14 | #15 | #16 | #17 |
| 134 | #1 | #2 | #3 | #4 | #5 | #6 | #7 | #8 | #9 | #10 | #11 | #12 | #13 | #14 | #15 | #16 | #17 |
| ... | ... | ... | ... | ... | ... | ... | ... | ... | ... | ... | ... | ... | ... | ... | ... | ... | ... |
| 249 | #1 | #2 | #3 | #4 | #5 | #6 | #7 | #8 | #9 | #10 | #11 | #12 | #13 | #14 | #15 | #16 | #17 |
| 250 | | | | | | | | | | | | | | | | | |
| ... | ... | ... | ... | ... | ... | ... | ... | ... | ... | ... | ... | ... | ... | ... | ... | ... | ... |
| 255 | | | | | | | | | | | | | | | | | |
| 1 | OH | OH | OH | OH | OH | OH | OH | OH | OH | OH | OH | OH | OH | TSOH | TSOH | | |
| 2 | TSOH | TSOH | TSOH | TSOH | TSOH | TSOH | TSOH | TSOH | TSOH | TSOH | TSOH | TSOH | TSOH | TSOH | TSOH | TSOH | TSOH |
| 3 | TSOH | TSOH | TSOH | TSOH | TSOH | TSOH | TSOH | TSOH | TSOH | TSOH | TSOH | TSOH | TSOH | TSOH | TSOH | TSOH | TSOH |
| 4 | #1 | #2 | #3 | #4 | #5 | #6 | #7 | #8 | #9 | #10 | #11 | #12 | #13 | #14 | #15 | #16 | #17 |
| 5 | #1 | #2 | #3 | #4 | #5 | #6 | #7 | #8 | #9 | #10 | #11 | #12 | #13 | #14 | #15 | #16 | #17 |
| 6 | #1 | #2 | #3 | #4 | #5 | #6 | #7 | #8 | #9 | #10 | #11 | #12 | #13 | #14 | #15 | #16 | #17 |
| 7 | #1 | #2 | #3 | #4 | #5 | #6 | #7 | #8 | #9 | #10 | #11 | #12 | #13 | #14 | #15 | #16 | #17 |
| ... | ... | ... | ... | ... | ... | ... | ... | ... | ... | ... | ... | ... | ... | ... | ... | ... | ... |
| 122 | #1 | #2 | #3 | #4 | #5 | #6 | #7 | #8 | #9 | #10 | #11 | #12 | #13 | #14 | #15 | #16 | #17 |
| 123 | | | | | | | | | | | | | | | | | |
| ... | ... | ... | ... | ... | ... | ... | ... | ... | ... | ... | ... | ... | ... | ... | ... | ... | ... |
| 128 | | | | | | | | | | | | | | | | | OH |
| 129 | PSI | PSI | PSI | PSI | PSI | PSI | PSI | PSI | PSI | PSI | PSI | PSI | PSI | PSI | PSI | PSI | PSI |
| 130 | TSOH | TSOH | TSOH | TSOH | TSOH | TSOH | TSOH | TSOH | TSOH | TSOH | TSOH | TSOH | TSOH | TSOH | TSOH | TSOH | TSOH |
| 131 | #1 | #2 | #3 | #4 | #5 | #6 | #7 | #8 | #9 | #10 | #11 | #12 | #13 | #14 | #15 | #16 | #17 |
| 132 | #1 | #2 | #3 | #4 | #5 | #6 | #7 | #8 | #9 | #10 | #11 | #12 | #13 | #14 | #15 | #16 | #17 |
| 133 | #1 | #2 | #3 | #4 | #5 | #6 | #7 | #8 | #9 | #10 | #11 | #12 | #13 | #14 | #15 | #16 | #17 |
| 134 | #1 | #2 | #3 | #4 | #5 | #6 | #7 | #8 | #9 | #10 | #11 | #12 | #13 | #14 | #15 | #16 | #17 |
| ... | ... | ... | ... | ... | ... | ... | ... | ... | ... | ... | ... | ... | ... | ... | ... | ... | ... |
| 249 | #1 | #2 | #3 | #4 | #5 | #6 | #7 | #8 | #9 | #10 | #11 | #12 | #13 | #14 | #15 | #16 | #17 |
| 250 | | | | | | | | | | | | | | | | | |
| ... | ... | ... | ... | ... | ... | ... | ... | ... | ... | ... | ... | ... | ... | ... | ... | ... | ... |
| 255 | | | | | | | | | | | | | | | | | |
| 1 | FAS | FAS | FAS | FAS | FAS | FAS | MFAS | OH | OH | OH | OH | OH | OH | OH | TSOH | TSOH | |
| 2 | TSOH | TSOH | TSOH | TSOH | TSOH | TSOH | TSOH | TSOH | TSOH | TSOH | TSOH | TSOH | TSOH | TSOH | TSOH | TSOH | TSOH |
| 3 | TSOH | TSOH | TSOH | TSOH | TSOH | TSOH | TSOH | TSOH | TSOH | TSOH | TSOH | TSOH | TSOH | TSOH | TSOH | TSOH | TSOH |
| 4 | #1 | #2 | #3 | #4 | #5 | #6 | #7 | #8 | #9 | #10 | #11 | #12 | #13 | #14 | #15 | #16 | #17 |
| ... | ... | ... | ... | ... | ... | ... | ... | ... | ... | ... | ... | ... | ... | ... | ... | ... | ... |

FIG.16D

| | ch #18 | ch #19 | ch #20 | ch #21 | ch #22 | ch #23 | ch #24 | ch #25 | ch #26 | ch #27 | ch #28 | ch #29 | ch #30 | ch #31 | ch #32 |
|---|---|---|---|---|---|---|---|---|---|---|---|---|---|---|---|
| t0 | TSOH | TSOH | TSOH | TSOH | TSOH | TSOH | TSOH | TSOH | TSOH | TSOH | TSOH | TSOH | TSOH | TSOH | TSOH |
| | TSOH | TSOH | TSOH | TSOH | TSOH | TSOH | TSOH | TSOH | TSOH | TSOH | TSOH | TSOH | TSOH | TSOH | TSOH |
| | #18 | #19 | #20 | #21 | #22 | #23 | #24 | #25 | #26 | #27 | #28 | #29 | #30 | #31 | #32 |
| | #18 | #19 | #20 | #21 | #22 | #23 | #24 | #25 | #26 | #27 | #28 | #29 | #30 | #31 | #32 |
| | #18 | #19 | #20 | #21 | #22 | #23 | #24 | #25 | #26 | #27 | #28 | #29 | #30 | #31 | #32 |
| | ... | ... | ... | ... | ... | ... | ... | ... | ... | ... | ... | ... | ... | ... | ... |
| | #18 | #19 | #20 | #21 | #22 | #23 | #24 | #25 | #26 | #27 | #28 | #29 | #30 | #31 | #32 |
| | | | | | | | | | | | | | | | |
| | ... | ... | ... | ... | ... | ... | ... | ... | ... | ... | ... | ... | ... | ... | ... |
| | OH | OH | OH | OH | OH | OH | OH | OH | OH | OH | OH | OH | OH | TSOH | TSOH |
| | TSOH | TSOH | TSOH | TSOH | TSOH | TSOH | TSOH | TSOH | TSOH | TSOH | TSOH | TSOH | TSOH | TSOH | TSOH |
| | TSOH | TSOH | TSOH | TSOH | TSOH | TSOH | TSOH | TSOH | TSOH | TSOH | TSOH | TSOH | TSOH | TSOH | TSOH |
| | #18 | #19 | #20 | #21 | #22 | #23 | #24 | #25 | #26 | #27 | #28 | #29 | #30 | #31 | #32 |
| | #18 | #19 | #20 | #21 | #22 | #23 | #24 | #25 | #26 | #27 | #28 | #29 | #30 | #31 | #32 |
| | #18 | #19 | #20 | #21 | #22 | #23 | #24 | #25 | #26 | #27 | #28 | #29 | #30 | #31 | #32 |
| | #18 | #19 | #20 | #21 | #22 | #23 | #24 | #25 | #26 | #27 | #28 | #29 | #30 | #31 | #32 |
| | ... | ... | ... | ... | ... | ... | ... | ... | ... | ... | ... | ... | ... | ... | ... |
| | #18 | #19 | #20 | #21 | #22 | #23 | #24 | #25 | #26 | #27 | #28 | #29 | #30 | #31 | #32 |
| | | | | | | | | | | | | | | | |
| | ... | ... | ... | ... | ... | ... | ... | ... | ... | ... | ... | ... | ... | ... | ... |
| | | | | | | | | | | | | | | | |
| | TSOH | TSOH | TSOH | TSOH | TSOH | TSOH | TSOH | TSOH | TSOH | TSOH | TSOH | TSOH | TSOH | TSOH | TSOH |
| | TSOH | TSOH | TSOH | TSOH | TSOH | TSOH | TSOH | TSOH | TSOH | TSOH | TSOH | TSOH | TSOH | TSOH | TSOH |
| | #18 | #19 | #20 | #21 | #22 | #23 | #24 | #25 | #26 | #27 | #28 | #29 | #30 | #31 | #32 |
| | #18 | #19 | #20 | #21 | #22 | #23 | #24 | #25 | #26 | #27 | #28 | #29 | #30 | #31 | #32 |
| | #18 | #19 | #20 | #21 | #22 | #23 | #24 | #25 | #26 | #27 | #28 | #29 | #30 | #31 | #32 |
| | #18 | #19 | #20 | #21 | #22 | #23 | #24 | #25 | #26 | #27 | #28 | #29 | #30 | #31 | #32 |
| | ... | ... | ... | ... | ... | ... | ... | ... | ... | ... | ... | ... | ... | ... | ... |
| | #18 | #19 | #20 | #21 | #22 | #23 | #24 | #25 | #26 | #27 | #28 | #29 | #30 | #31 | #32 |
| | | | | | | | | | | | | | | | |
| | ... | ... | ... | ... | ... | ... | ... | ... | ... | ... | ... | ... | ... | ... | ... |
| | OH | OH | OH | OH | OH | OH | OH | OH | OH | OH | OH | OH | OH | OH | PSI |
| | PSI | PSI | PSI | PSI | PSI | PSI | PSI | PSI | PSI | PSI | PSI | PSI | PSI | PSI | PSI |
| | TSOH | TSOH | TSOH | TSOH | TSOH | TSOH | TSOH | TSOH | TSOH | TSOH | TSOH | TSOH | TSOH | TSOH | TSOH |
| | #18 | #19 | #20 | #21 | #22 | #23 | #24 | #25 | #26 | #27 | #28 | #29 | #30 | #31 | #32 |
| | #18 | #19 | #20 | #21 | #22 | #23 | #24 | #25 | #26 | #27 | #28 | #29 | #30 | #31 | #32 |
| | #18 | #19 | #20 | #21 | #22 | #23 | #24 | #25 | #26 | #27 | #28 | #29 | #30 | #31 | #32 |
| | #18 | #19 | #20 | #21 | #22 | #23 | #24 | #25 | #26 | #27 | #28 | #29 | #30 | #31 | #32 |
| | ... | ... | ... | ... | ... | ... | ... | ... | ... | ... | ... | ... | ... | ... | ... |
| | #18 | #19 | #20 | #21 | #22 | #23 | #24 | #25 | #26 | #27 | #28 | #29 | #30 | #31 | #32 |
| | | | | | | | | | | | | | | | |
| | ... | ... | ... | ... | ... | ... | ... | ... | ... | ... | ... | ... | ... | ... | ... |
| | | | | | | | | | | | | | | | |
| | TSOH | TSOH | TSOH | TSOH | TSOH | TSOH | TSOH | TSOH | TSOH | TSOH | TSOH | TSOH | TSOH | TSOH | TSOH |
| | TSOH | TSOH | TSOH | TSOH | TSOH | TSOH | TSOH | TSOH | TSOH | TSOH | TSOH | TSOH | TSOH | TSOH | TSOH |
| | #18 | #19 | #20 | #21 | #22 | #23 | #24 | #25 | #26 | #27 | #28 | #29 | #30 | #31 | #32 |
| | ... | ... | ... | ... | ... | ... | ... | ... | ... | ... | ... | ... | ... | ... | ... |

FIG.16E

| ch #1 | ch #2 | ch #3 | ch #4 | ch #5 | ch #6 | ch #7 | ch #8 | ch #9 | ch #10 | ch #11 | ch #12 | ch #13 | ch #14 | ch #15 | ch #16 |
|---|---|---|---|---|---|---|---|---|---|---|---|---|---|---|---|
| FAS | FAS | FAS | FAS | FAS | FAS | MFAS | OH | OH | OH | OH | OH | OH | OH | TSOH | TSOH |
| #17 | #18 | #19 | #20 | #21 | #22 | #23 | #24 | #25 | #26 | #27 | #28 | #29 | #30 | #31 | #32 |
| #17 | #18 | #19 | #20 | #21 | #22 | #23 | #24 | #25 | #26 | #27 | #28 | #29 | #30 | #31 | #32 |
| #17 | #18 | #19 | #20 | #21 | #22 | #23 | #24 | #25 | #26 | #27 | #28 | #29 | #30 | #31 | #32 |
| #17 | #18 | #19 | #20 | #21 | #22 | #23 | #24 | #25 | #26 | #27 | #28 | #29 | #30 | #31 | #32 |
| ... | ... | ... | ... | ... | ... | ... | ... | ... | ... | ... | ... | ... | ... | ... | ... |
| #17 | #18 | #19 | #20 | #21 | #22 | #23 | #24 | #25 | #26 | #27 | #28 | #29 | #30 | #31 | #32 |
|  |  |  |  |  |  |  |  |  |  |  |  |  |  |  |  |
|  |  |  |  |  |  |  |  |  |  |  |  |  |  |  |  |
| ... | ... | ... | ... | ... | ... | ... | ... | ... | ... | ... | ... | ... | ... | ... | ... |
|  |  |  |  |  |  |  |  |  |  |  |  |  |  |  |  |
| #1 | #2 | #3 | #4 | #5 | #6 | #7 | #8 | #9 | #10 | #11 | #12 | #13 | #14 | #15 | #16 |
| #1 | #2 | #3 | #4 | #5 | #6 | #7 | #8 | #9 | #10 | #11 | #12 | #13 | #14 | #15 | #16 |
| #1 | #2 | #3 | #4 | #5 | #6 | #7 | #8 | #9 | #10 | #11 | #12 | #13 | #14 | #15 | #16 |
| #1 | #2 | #3 | #4 | #5 | #6 | #7 | #8 | #9 | #10 | #11 | #12 | #13 | #14 | #15 | #16 |
| ... | ... | ... | ... | ... | ... | ... | ... | ... | ... | ... | ... | ... | ... | ... | ... |
| #1 | #2 | #3 | #4 | #5 | #6 | #7 | #8 | #9 | #10 | #11 | #12 | #13 | #14 | #15 | #16 |
|  |  |  |  |  |  |  |  |  |  |  |  |  |  |  |  |
|  |  |  |  |  |  |  |  |  |  |  |  |  |  |  |  |
| ... | ... | ... | ... | ... | ... | ... | ... | ... | ... | ... | ... | ... | ... | ... | ... |
| OH | OH | OH | OH | OH | OH | OH | OH | OH | OH | OH | OH | OH | OH | TSOH | TSOH |
| #17 | #18 | #19 | #20 | #21 | #22 | #23 | #24 | #25 | #26 | #27 | #28 | #29 | #30 | #31 | #32 |
| #17 | #18 | #19 | #20 | #21 | #22 | #23 | #24 | #25 | #26 | #27 | #28 | #29 | #30 | #31 | #32 |
| #17 | #18 | #19 | #20 | #21 | #22 | #23 | #24 | #25 | #26 | #27 | #28 | #29 | #30 | #31 | #32 |
| #17 | #18 | #19 | #20 | #21 | #22 | #23 | #24 | #25 | #26 | #27 | #28 | #29 | #30 | #31 | #32 |
| ... | ... | ... | ... | ... | ... | ... | ... | ... | ... | ... | ... | ... | ... | ... | ... |
| #17 | #18 | #19 | #20 | #21 | #22 | #23 | #24 | #25 | #26 | #27 | #28 | #29 | #30 | #31 | #32 |
|  |  |  |  |  |  |  |  |  |  |  |  |  |  |  |  |
|  |  |  |  |  |  |  |  |  |  |  |  |  |  |  |  |
| ... | ... | ... | ... | ... | ... | ... | ... | ... | ... | ... | ... | ... | ... | ... | ... |
|  |  |  |  |  |  |  |  |  |  |  |  |  |  |  |  |
| #1 | #2 | #3 | #4 | #5 | #6 | #7 | #8 | #9 | #10 | #11 | #12 | #13 | #14 | #15 | #16 |
| #1 | #2 | #3 | #4 | #5 | #6 | #7 | #8 | #9 | #10 | #11 | #12 | #13 | #14 | #15 | #16 |
| #1 | #2 | #3 | #4 | #5 | #6 | #7 | #8 | #9 | #10 | #11 | #12 | #13 | #14 | #15 | #16 |
| #1 | #2 | #3 | #4 | #5 | #6 | #7 | #8 | #9 | #10 | #11 | #12 | #13 | #14 | #15 | #16 |
| ... | ... | ... | ... | ... | ... | ... | ... | ... | ... | ... | ... | ... | ... | ... | ... |
| #1 | #2 | #3 | #4 | #5 | #6 | #7 | #8 | #9 | #10 | #11 | #12 | #13 | #14 | #15 | #16 |
|  |  |  |  |  |  |  |  |  |  |  |  |  |  |  |  |
|  |  |  |  |  |  |  |  |  |  |  |  |  |  |  |  |
| ... | ... | ... | ... | ... | ... | ... | ... | ... | ... | ... | ... | ... | ... | ... | ... |
| FAS | FAS | FAS | FAS | FAS | FAS | MFAS | OH | OH | OH | OH | OH | OH | OH | TSOH | TSOH |

FIG.16F

| | ch #17 | ch #18 | ch #19 | ch #20 | ch #21 | ch #22 | ch #23 | ch #24 | ch #25 | ch #26 | ch #27 | ch #28 | ch #29 | ch #30 | ch #31 | ch #32 ←t0 |
|---|---|---|---|---|---|---|---|---|---|---|---|---|---|---|---|---|
| #1 | #2 | #3 | #4 | #5 | #6 | #7 | #8 | #9 | #10 | #11 | #12 | #13 | #14 | #15 | #16 |
| #1 | #2 | #3 | #4 | #5 | #6 | #7 | #8 | #9 | #10 | #11 | #12 | #13 | #14 | #15 | #16 |
| #1 | #2 | #3 | #4 | #5 | #6 | #7 | #8 | #9 | #10 | #11 | #12 | #13 | #14 | #15 | #16 |
| #1 | #2 | #3 | #4 | #5 | #6 | #7 | #8 | #9 | #10 | #11 | #12 | #13 | #14 | #15 | #16 |
| ... | ... | ... | ... | ... | ... | ... | ... | ... | ... | ... | ... | ... | ... | ... | ... |
| #1 | #2 | #3 | #4 | #5 | #6 | #7 | #8 | #9 | #10 | #11 | #12 | #13 | #14 | #15 | #16 |
| | | | | | | | | | | | | | | | |
| | | | | | | | | | | | | | | | |
| | | | | | | | | | | | | | | | |
| ... | ... | ... | ... | ... | ... | ... | ... | ... | ... | ... | ... | ... | ... | ... | ... |
| OH | OH | OH | OH | OH | OH | OH | OH | OH | OH | OH | OH | OH | OH | TSOH | TSOH |
| #17 | #18 | #19 | #20 | #21 | #22 | #23 | #24 | #25 | #26 | #27 | #28 | #29 | #30 | #31 | #32 |
| #17 | #18 | #19 | #20 | #21 | #22 | #23 | #24 | #25 | #26 | #27 | #28 | #29 | #30 | #31 | #32 |
| #17 | #18 | #19 | #20 | #21 | #22 | #23 | #24 | #25 | #26 | #27 | #28 | #29 | #30 | #31 | #32 |
| #17 | #18 | #19 | #20 | #21 | #22 | #23 | #24 | #25 | #26 | #27 | #28 | #29 | #30 | #31 | #32 |
| ... | ... | ... | ... | ... | ... | ... | ... | ... | ... | ... | ... | ... | ... | ... | ... |
| #17 | #18 | #19 | #20 | #21 | #22 | #23 | #24 | #25 | #26 | #27 | #28 | #29 | #30 | #31 | #32 |
| | | | | | | | | | | | | | | | |
| | | | | | | | | | | | | | | | |
| | | | | | | | | | | | | | | | |
| ... | ... | ... | ... | ... | ... | ... | ... | ... | ... | ... | ... | ... | ... | ... | ... |
| #1 | #2 | #3 | #4 | #5 | #6 | #7 | #8 | #9 | #10 | #11 | #12 | #13 | #14 | #15 | #16 |
| #1 | #2 | #3 | #4 | #5 | #6 | #7 | #8 | #9 | #10 | #11 | #12 | #13 | #14 | #15 | #16 |
| #1 | #2 | #3 | #4 | #5 | #6 | #7 | #8 | #9 | #10 | #11 | #12 | #13 | #14 | #15 | #16 |
| #1 | #2 | #3 | #4 | #5 | #6 | #7 | #8 | #9 | #10 | #11 | #12 | #13 | #14 | #15 | #16 |
| ... | ... | ... | ... | ... | ... | ... | ... | ... | ... | ... | ... | ... | ... | ... | ... |
| #1 | #2 | #3 | #4 | #5 | #6 | #7 | #8 | #9 | #10 | #11 | #12 | #13 | #14 | #15 | #16 |
| | | | | | | | | | | | | | | | |
| | | | | | | | | | | | | | | | |
| | | | | | | | | | | | | | | | |
| ... | ... | ... | ... | ... | ... | ... | ... | ... | ... | ... | ... | ... | ... | ... | ... |
| OH | OH | OH | OH | OH | OH | OH | OH | OH | OH | OH | OH | OH | OH | PSI | TSOH |
| #17 | #18 | #19 | #20 | #21 | #22 | #23 | #24 | #25 | #26 | #27 | #28 | #29 | #30 | #31 | #32 |
| #17 | #18 | #19 | #20 | #21 | #22 | #23 | #24 | #25 | #26 | #27 | #28 | #29 | #30 | #31 | #32 |
| #17 | #18 | #19 | #20 | #21 | #22 | #23 | #24 | #25 | #26 | #27 | #28 | #29 | #30 | #31 | #32 |
| #17 | #18 | #19 | #20 | #21 | #22 | #23 | #24 | #25 | #26 | #27 | #28 | #29 | #30 | #31 | #32 |
| ... | ... | ... | ... | ... | ... | ... | ... | ... | ... | ... | ... | ... | ... | ... | ... |
| #17 | #18 | #19 | #20 | #21 | #22 | #23 | #24 | #25 | #26 | #27 | #28 | #29 | #30 | #31 | #32 |
| | | | | | | | | | | | | | | | |
| | | | | | | | | | | | | | | | |
| | | | | | | | | | | | | | | | |
| ... | ... | ... | ... | ... | ... | ... | ... | ... | ... | ... | ... | ... | ... | ... | ... |
| #1 | #2 | #3 | #4 | #5 | #6 | #7 | #8 | #9 | #10 | #11 | #12 | #13 | #14 | #15 | #16 |

SIGNAL DEMULTIPLEXER, SIGNAL MULTIPLEXER, AND SIGNAL MULTIPLEXER/DEMULTIPLEXER

CROSS-REFERENCE TO RELATED APPLICATION

This patent application is based upon and claims the benefit of priority of the prior Japanese Patent Application No. 2011-054619 filed on Mar. 11, 2011, the entire contents of which are incorporated herein by reference.

FIELD

The embodiments discussed herein are related to a signal demultiplexer, a signal multiplexer, and a signal multiplexer/demultiplexer.

BACKGROUND

In recent years, OTN (Optical Transport Network) has been standardized at ITU-T. OTN is based on the premise of wavelength-division multiplexing (WDM), with which the significant increase in Internet traffic can be accommodated. OTN has been standardized as a platform for performing transmission in a transparent manner. Specifically, in OTN transmission, an upper-level layer can totally disregard the lower-level layer, when transmitting client signals in end-to-end communication. Examples of client signals are those of a synchronous network such as Synchronous Optical Network (SONET) or Synchronous Digital Hierarchy (SDH), as well as those of an asynchronous network such as Internet Protocol (IP) or Ethernet (registered trademark). The interface and the frame format of OTN have been standardized as the ITU-T standard G.709, and are rapidly being installed in commercial systems.

Consideration is given to multiplexing (multiplex storing) and demultiplexing a signal transfer frame having a low signal speed (Optical Channel Data Unit 'j':ODUj) and a signal transfer frame having a higher signal speed than ODUj (Optical Channel Data Unit 'k':ODUk), in a network where an interface complying with the ITU-T standard G.709 is applied.

For example, an ODU frame storing a client Ethernet (registered trademark) signal is referred to as a Lower Order ODU (LO_ODU), and an ODU frame storing plural low speed ODU frames by multiplexing is referred to as a Higher Order ODU (HO_ODU). That is to say, a low speed frame for transferring signals ODUj (for example, ODU1) is stored by multiplexing in a frame of a high signal speed HO_ODUk (including, for example, ODU2, ODU3, and ODU4). The low speed frame for transferring signals may be either LO_ODUj or HO_ODUj. That is to say, HO_ODUj may be multiplexed in HO_ODUk.

The operation of multiplexing ODUj frames in HO_ODUk is implemented by defining tributary slots (TS) that are time slots generated by dividing an OPUk (Optical Channel Payload Unit 'k') payload area, which is the payload part of a HO_ODUk frame, into ts areas in units of bytes, and storing ODUj in each TS of the payload area of the HO_ODUk frame.

The ITU-T standard G.709 defines two types of tributary slots (TS), i.e., one type having a bandwidth per TS of approximately 1.25 Gbps and another type having a bandwidth per TS of approximately 2.5 Gbps. When the bandwidth per TS is approximately 1.25 Gbps, the numbers of tributary slots ts are as illustrated in FIGS. 1A and 1B. Specifically, ts=2 for HO_ODU1, ts=8 for HO_ODU2, ts=32 for HO_ODU3, and ts=80 for HO_ODU4.

When the bandwidth per TS is approximately 2.5 Gbps, the numbers of tributary slots ts are as illustrated in FIG. 2. Specifically, ts=4 for HO_ODU2 and ts=16 for HO_ODU3. In FIGS. 1A through 2, TS#i (i=1 through 80) expresses tributary slots, OH expresses Overhead, FS expresses Fixed Stuff, and FEC expresses Forward Error Correction.

FIG. 3 illustrates how an ODU0 frame and an ODU1 frame are mapped into an OPU2 frame. In FIG. 3, an ODU0 frame is mapped into TS#1 of the payload area of the OPU2 frame, and an ODU1 frame is mapped into TS#4 and TS#8 of the payload area of the OPU2 frame. In this case, the number of tributary slots M occupied by the ODU1 in the payload area of HO_ODU2 is two.

The procedures of multiplexing ODUj into HO_ODUk are described below.

(1) According to the combination of ODUj, HO_ODUk, and the TS bandwidth, the multiplexing/demultiplexing method is determined to be either one of the following two methods. The first method is the Asynchronous Mapping Procedure (AMP) and the second method is the Generalized Mapping Procedure (GMP).

(2) According to the bandwidth (bit rate) of ODUj, the number of tributary slots M and the TS positions occupied by the ODUj in the payload area (OPUk) of HO_ODUk storing ODUj are determined.

(3) ODUj is stored in M number of tributary slots of HO_ODUk, while performing stuff processing by inserting null data according to the sum of the bandwidths of the M tributary slots and the difference of bandwidths of ODUj, by using the AMP method or the GMP method.

As described above, there are two methods, the AMP method and the GMP method, depending on the frequency adjustment method. The GMP method is a new method standardized when the ITU-T standard G.709 was revised in December, 2009. The AMP method is for performing multiplexing/demultiplexing while absorbing the frequency difference and the frequency deviation between the tributary slots (TS) of ODUj and HO_ODUk by inserting stuff in units of bytes (−1 through +2 bytes). The GMP method is for performing multiplexing/demultiplexing while absorbing the frequency difference and the frequency deviation between the tributary slots (TS) of ODUj and HO_ODUk by inserting stuff in units of M bytes. Here, M is the number of tributary slots (TS) of HO_ODU occupied when ODUj frames are stored into HO_ODU. Before the ITU-T standard G.709 was revised (before in December, 2009), multiplexing/demultiplexing was performed between signal frames by applying only the AMP method. However, presently, there is a need for performing multiplexing/demultiplexing between signal frames in an environment where both the AMP method and the GMP method are used. In this case, two separate processing units for the AMP method and the GMP method, and a circuit for selecting one of the two methods are needed. Thus, it is obvious that the scale of the system will be two times that of the case where only the prior method (AMP method) is used.

FIG. 4 illustrates a configuration of a conventional multiplexer/demultiplexer for multiplexing ODUj into HO_ODUk of OTUk, and demultiplexing ODUj from HO_ODUk of OTUk. The multiplexer/demultiplexer includes a demultiplexing block 10 and a multiplexing block 30. As an example, a description is given of procedures of demultiplexing ODUj from HO_ODUk of OTUk.

The demultiplexing block 10, which demultiplexes ODUj from HO_ODUk of OTUk, includes an OTUk processing unit 11, a HO_ODUk processing unit 12, a demultiplexer in units of bytes 13, an ODTU processing unit for AMP method 14, an ODTU processing unit for GMP method 15, a demapping unit for AMP method 16, a demapping unit for GMP method 17, selectors 18, 19, an ODUj processing unit 20, clock reproduction units 21, 22, and a clock generating unit 23.

The OTUk processing unit 11 extracts a HO_ODUk signal from an OTUk signal received from the network. At this time, the clock reproduction unit 21 extracts an OTUk clock from the received OTUk signal, and reproduces the OTUk clock. The clock generating unit 23 multiplies the OTUk clock by 239/255 and generates a HO_ODUk clock. The OTUk clock is generated in association with removing FEC from the OTUk signal and generating the HO_ODUk signal.

The demultiplexer 13 demultiplexes HO_ODUk signals in units of bytes and outputs them to the tributary slots TS#i.

The ODTU processing unit for AMP method 14 multiplexes, in units of bytes, the tributary slots TS#i in the OPUk payload area in which ODUj is stored, and forms an intermediate frame ODTUjk for the AMP method.

The ODTU processing unit for GMP method 15 multiplexes, in units of bytes, the tributary slots TS#i in the OPUk payload area in which ODUj is stored, and forms an intermediate frame ODTUk.ts for the GMP method.

The demapping unit for AMP method 16 extracts an ODUj signal from the intermediate frame ODTUjk, and supplies the ODUj signal from the selector 18 to the ODUj processing unit 20, and supplies the clock information of the intermediate frame ODTUjk from the selector 19 to the clock reproduction unit 22.

The demapping unit for GMP method 17 extracts an ODUj signal from the intermediate frame ODTUk.ts, and supplies the ODUj signal from the selector 18 to the ODUj processing unit 20, and supplies the clock information of the intermediate frame ODTUk.ts from the selector 19 to the clock reproduction unit 22.

The clock reproduction unit 22 uses the read enable information supplied from the demapping unit for AMP method 16 or the demapping unit for GMP method 17 and the HO_ODUk clock supplied from the clock generating unit 23, and regenerates an ODUj clock. The ODUj processing unit 20 outputs the ODUj supplied from the selector 18, with the use of the ODUj clock supplied from the clock reproduction unit 22.

Incidentally, there is proposed a demultiplexing converter including a first timeslot converting unit which is provided between a low speed interface and a high speed interface for converting the time slots in units of N×64 kb/s according to read control contents, a second timeslot converting unit which is provided between one or more high-speed interfaces for converting the time slots in units of tributary units TU-M according to read control contents, and a selecting unit for selecting between the first and second timeslot converting units (see, for example, patent document 1).

Furthermore, there is known a technology relevant to a shared circuit method in which a time division multiplex demultiplexing unit (MLDM) of a terminal apparatus of an optical transmission system is provided with a regenerating (REG) function. Specifically, the clocks used for reproducing/sending signals may be switched between incoming clocks to transmission line clock components and external clocks (see, for example, patent document 2).

Furthermore, there is proposed a demultiplexer including an inverse conversion processing circuit for demapping plural low-speed transmission signals from high-speed transmission signals, a switch processing circuit with which demultiplexed low-speed transmission signals and input low-speed transmission signals may be arbitrarily rearranged, and a multiplex processing circuit for mapping the plural low-speed transmission signals to high-speed transmission signals (see, for example, patent document 3).

Patent document 1: Japanese Laid-Open Patent Publication No. H3-208428

Patent document 2: Japanese Laid-Open Patent Publication No. H4-258043

Patent document 3: Japanese Laid-Open Patent Publication No. 2008-182540

With the demultiplexer illustrated in FIG. 4, in an environment where both the AMP method and the GMP method are used, in order to extract ODUj from HO_ODUk of OTUk, there is a need for ODTU processing units 14, 15 provided respectively for the AMP method and the GMP method, and demapping units 16, 17 provided respectively for the AMP method and the GMP method. In this case, the circuit scale would be two times as large as a circuit in which only the AMP method is used.

SUMMARY

According to an aspect of the present invention, a signal demultiplexer is for demultiplexing plural low speed signal transfer frames from a signal storing area of a high speed signal transfer frame, the signal demultiplexer includes a terminating unit configured to terminate the high speed signal transfer frame, the high speed signal transfer frame including a first overhead area, the signal storing area, and a second overhead area, wherein a predetermined number of tributary slots for storing the plural low speed signal transfer frames are assigned to the signal storing area; a format conversion unit configured to convert a format of the high speed signal transfer frame output from the terminating unit into a format of a converted frame; a parallelization unit configured to parallelize the converted frame output from the format conversion unit into a number of data columns corresponding to the predetermined number, and to output the data columns; and a separating unit configured to separate the plural low speed signal transfer frames from the predetermined number of the data columns output from the parallelization unit, wherein the format conversion unit converts the format of the high speed signal transfer frame into the format of the converted frame by delaying the signal storing area of the high speed signal transfer frame using the first overhead area and the second overhead area, to include an "i" th tributary slot among the predetermined number of the tributary slots assigned to the signal storing area of the high speed signal transfer frame into an arbitrary "i" th data column among the predetermined number of the data columns created by parallelization of the high speed signal transfer frame, and to align front positions of the predetermined number of the data columns.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIGS. 1A and 1B are for describing the number of tributary slots ts of HO_ODUk;

FIG. 2 is for describing the number of tributary slots ts of HO_ODUk;

FIG. 5 illustrates combinations of ODUj and HO_ODUk;

FIG. 6 indicates the differences between the AMP method and the GMP method;

FIGS. 8A through 8D illustrate OTU3 frame formats at the respective units illustrated in FIG. 7;

FIG. 9 illustrates demapping units according to one embodiment;

FIG. 11 is for describing frame format conversion;

FIGS. 12A through 12F illustrate an OTU2 frame before frame format conversion;

FIGS. 13A through 13F illustrate how gap areas are secured in an OTU2 frame;

FIGS. 14A through 14F illustrate an OTU2 frame after frame format conversion;

FIGS. 15A and 15B illustrate an Ext.HO_ODU2 frame configuration, in which OTU2 frames are arranged in parallel with a width of eight bytes;

FIGS. 16A through 16F illustrate an Ext.HO_ODU3 frame configuration, in which OTU3 frames are arranged in parallel with a width of 32 bytes;

DESCRIPTION OF EMBODIMENTS

Preferred embodiments of the present invention will be explained with reference to accompanying drawings.

AMP Method and GMP Method

FIG. 5 illustrates combinations of ODUj and HO_ODUk, when ODUj is stored in HO_ODUk by multiplexing. FIG. 5 indicates that the AMP method is used in the case of multiplexing ODU0 in HO_ODU1, and that there is one tributary slot M that is occupied by ODU0 in the payload area of HO_ODU1. Furthermore, FIG. 5 indicates that the GMP method is used in the case of multiplexing ODU0 in ODU2, and that there is one tributary slot M that is occupied by ODU0 in the payload area of HO_ODU2. That is to say, it is determined whether to use the AMP method or the GMP method depending on the combination of ODUj and HO_ODUk.

Furthermore, FIG. 6 indicates the differences between the AMP method and the GMP method which are mapping methods used for multiplexing. That is to say, in the AMP method, the data insertion positions are the OPU payload area and the OPU overhead unit (PJO use), the stuff position where a stuff byte is inserted is a fixed position, multiplex/demultiplex processing (stuff/data insertion processing) is performed in units of one byte, and stuff processing is performed in the same frame as the JC byte information. Meanwhile, in the GMP method, the data insertion position is the OPU payload area, the stuff position changes according to the amount of stuff, multiplex/demultiplex processing is performed in units of M bytes, and stuff processing is performed with the JC byte information in one (multi) preceding frame.

In consideration of the above, the multiplexing/demultiplexing process from ODUj to HO_ODUk is performed with respect to a byte stream of each Tributary Slot (TS). When there are two or more tributary slots M when multiplexing ODUj into HO_ODUk, the byte streams of the M number of tributary slots are connected when processing.

Multiplexer/Demultiplexer, Demultiplexing Block

Figure 3:
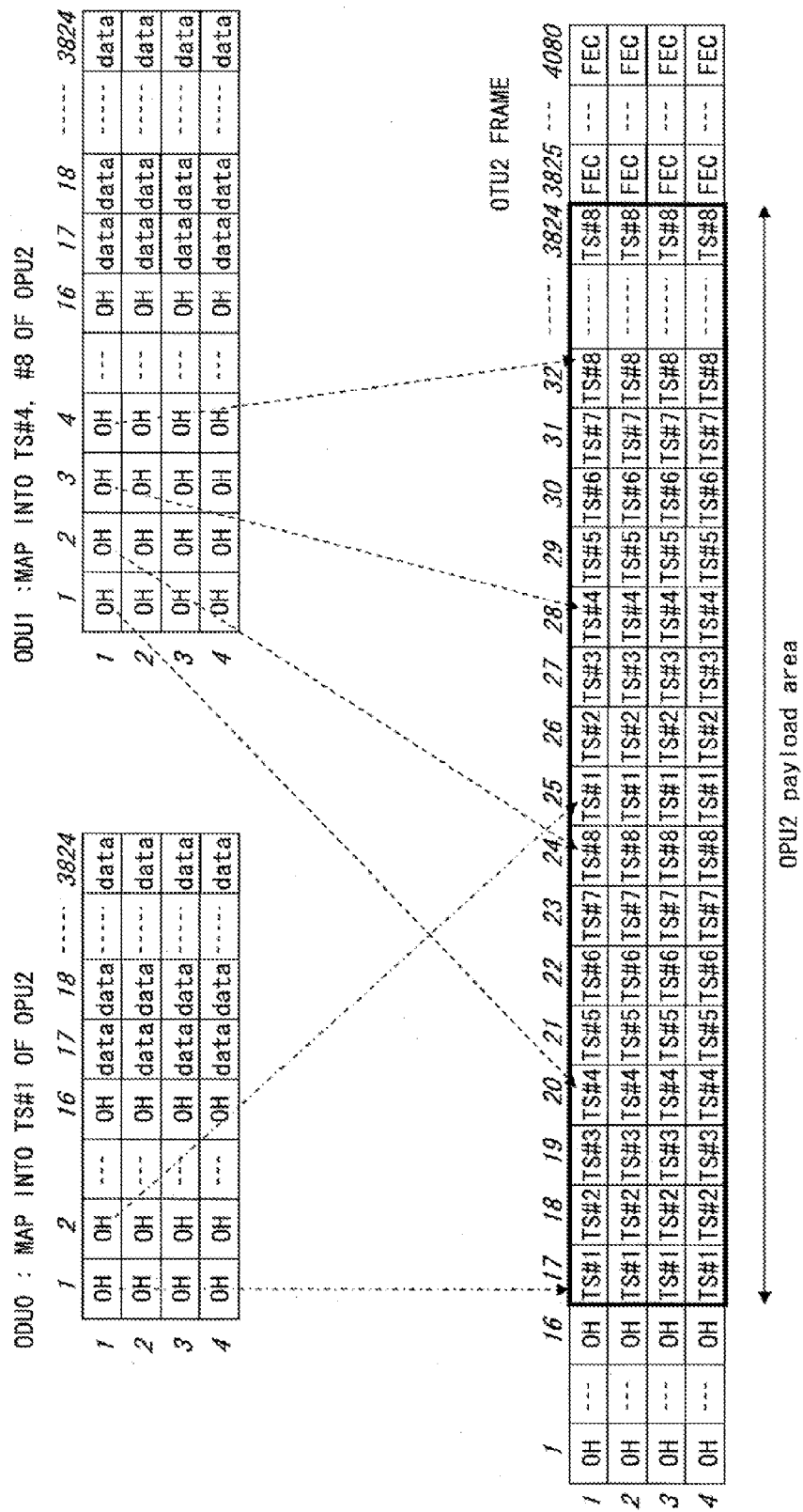
FIG. 3 illustrates how an ODU0 frame and an ODU1 frame are mapped into an OPU2 frame.
Figure 4:
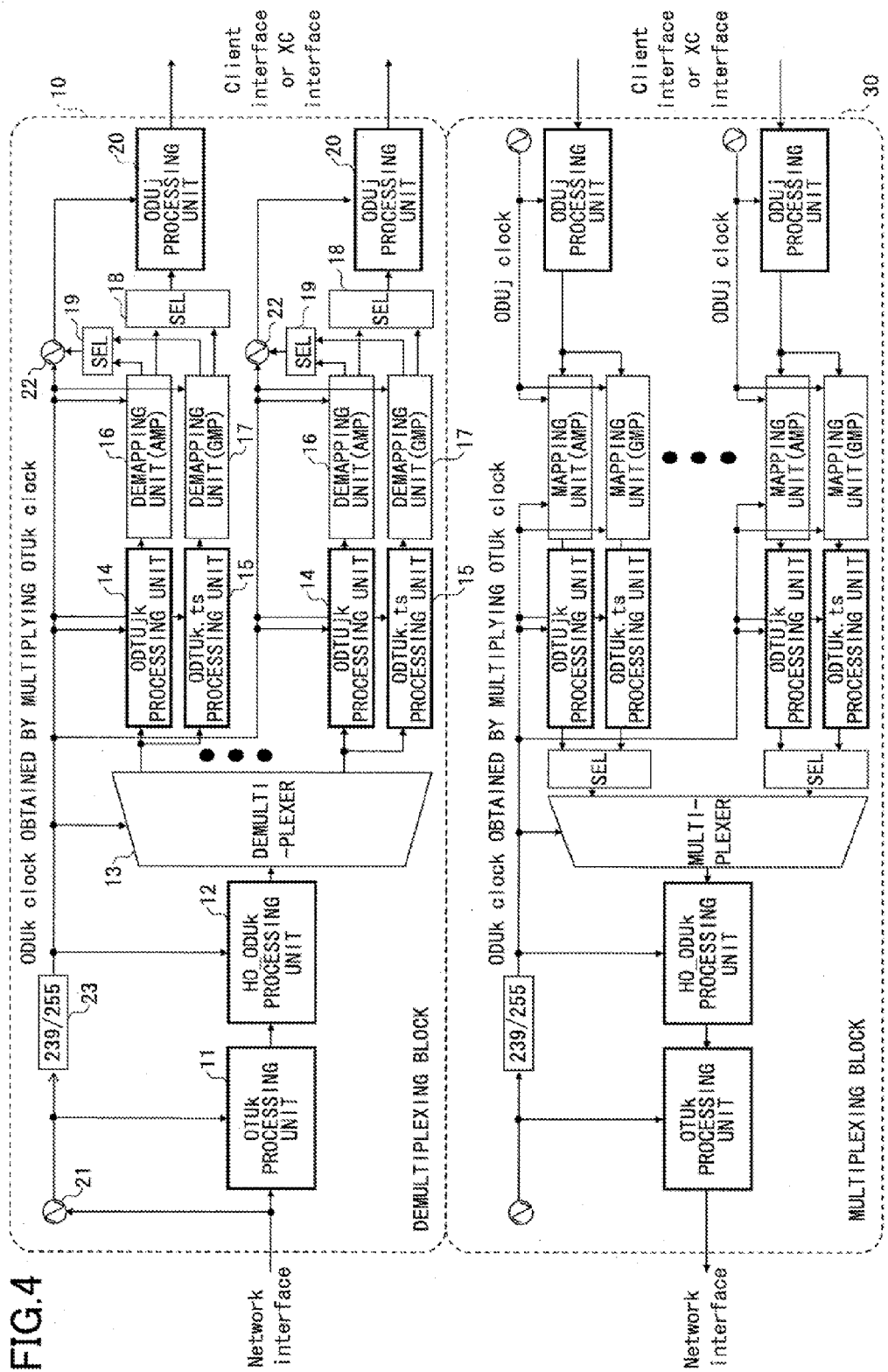
FIG. 4 illustrates a configuration of a conventional multiplexer/demultiplexer.
Figure 7:
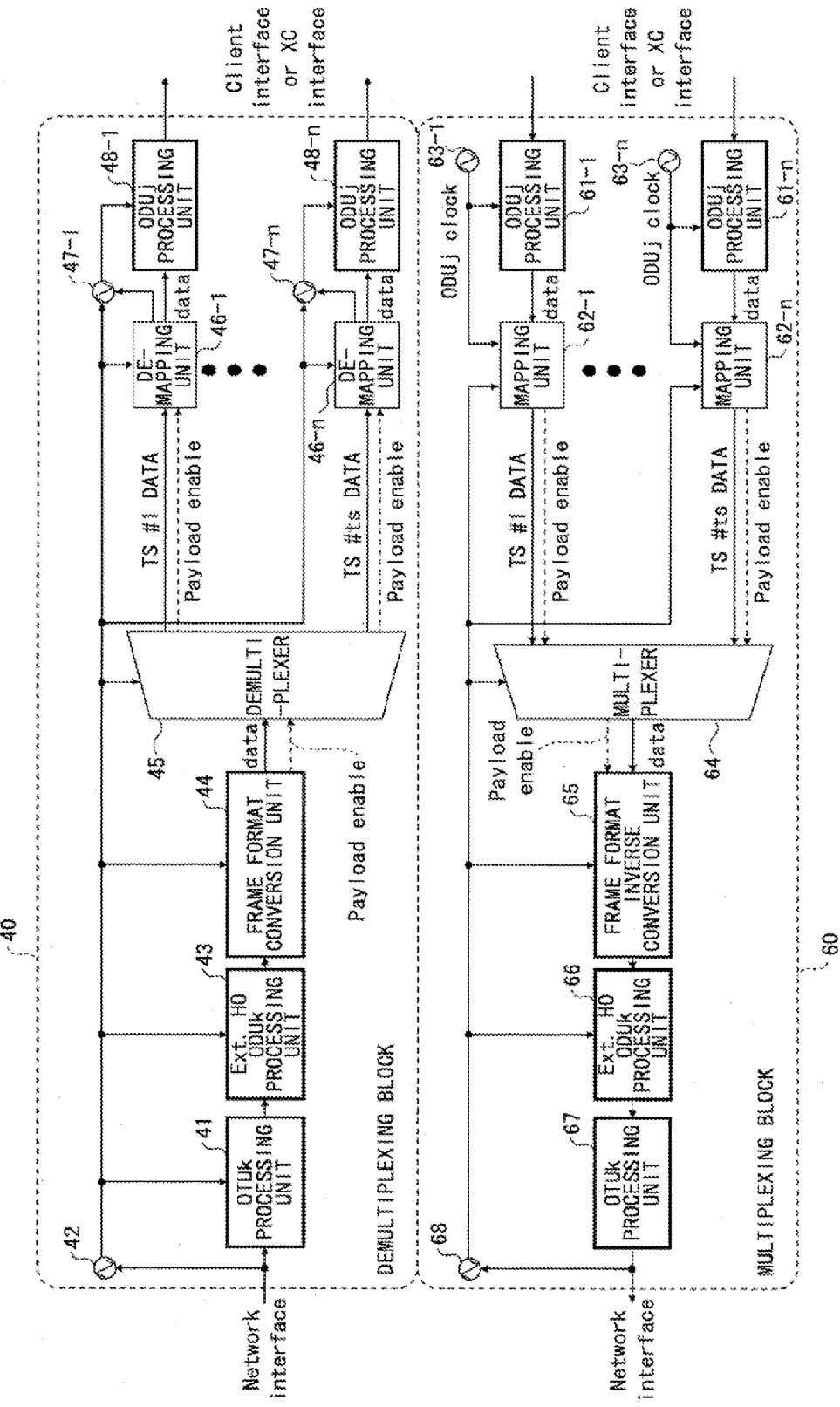
FIG. 7 illustrates a multiplexer/demultiplexer according to one embodiment.

FIG. 7 illustrates a multiplexer/demultiplexer according to one embodiment, which multiplexes ODUj into HO_ODUk of OTUk, and demultiplexes ODUj from HO_ODUk of OTUk. The multiplexer/demultiplexer includes a demultiplexing block 40 and a multiplexing block 60.

The demultiplexing block 40 that demultiplexes the ODUj from the HO_ODUk of the OTUk includes an OTUk processing unit 41, a clock reproduction unit 42, an Ext.HO_ODUk processing unit 43 that operates based on OTUk clocks, a frame format conversion unit 44 that operates based on OTUk clocks, a demultiplexer 45 that operates based on OTUk clocks, demapping units 46-1 through 46-n of an AMP method and a GMP method, clock reproduction units 47-1 through 47-n, and ODUj processing units 48-1 through 48-n.

Figure 8A:
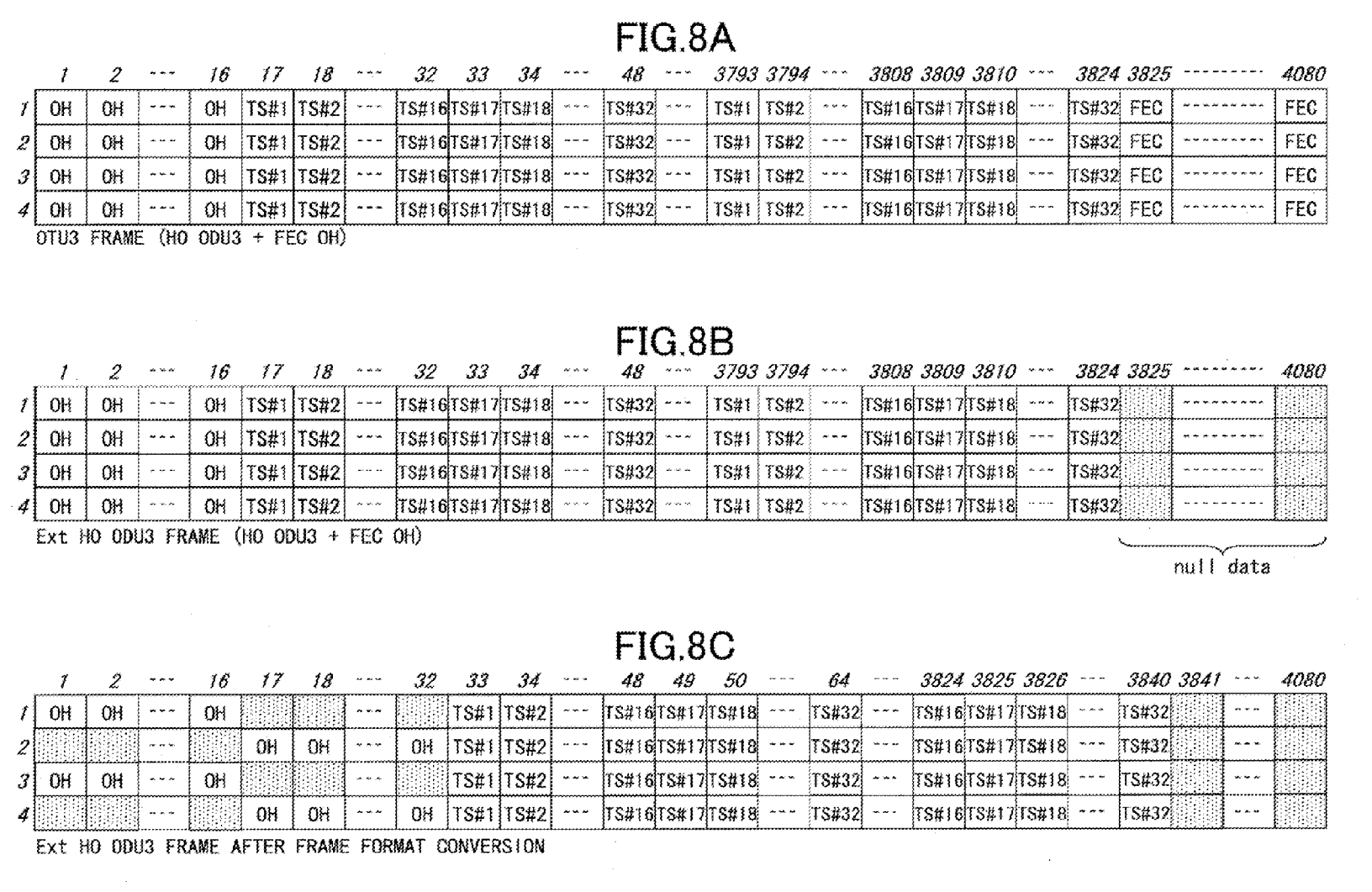

The OTUk processing unit 41 performs a termination process on an OTUk signal received from the network at the OTUk processing unit 41. The clock reproduction unit 42 extracts an OTUk clock from the received OTUk signal and reproduces the OTUk clock. FIG. 8A indicates an example of an OTU3 frame output by the OTUk processing unit 41 that operates based on OTU3 clocks. However, the OTUk overhead (OH) and the FEC overhead of the OTU3 frame are terminated at the OTUk processing unit 41. Thus, there are cases in which unfixed data or null data are stored in the OTUk overhead (OH) and the FEC overhead. The OTU3 frame is transmitted in the order of the first column to the 4080th column of the first row, the first column to the 4080th column of the second row, the first column to the 4080th column of the third row, and the first column to the 4080th column of the fourth row.

At the Ext.HO_ODUk processing unit 43, a HO_ODUk that operates based on OTUk clocks, is extracted from the OTU3 frame. FIG. 8B illustrates an example of an ODU3 frame output from the Ext.HO_ODUk processing unit 43. The FEC block of the OTU3 frame is in a signal format filled with invalid data '0'. The frame illustrated in FIG. 8B is referred to as an Extended HO_ODU3 (Ext.HO_ODU3) frame. The Ext.HO_ODUk frame generated at the Ext.HO_ODUk processing unit 43 is supplied to the frame format conversion unit 44.

The frame format conversion unit 44 uses the null data block of the Ext.HO_ODUk frame to delay the payload area of HO_ODUk and, according to need, the overhead (OH) information of HO_ODUk, to convert the Ext.HO_ODUk frame into a converted frame in a signal format appropriate for processing performed in units of bytes at the demultiplexer 45. FIG. 8C illustrates an example of the frame format of the converted frame.

In the Ext.HO_ODU3 frame illustrated in FIG. 8B, the payload area of HO_ODU3 is located from the 17th column through the 3824th column. Meanwhile, as illustrated in FIG. 8C, the payload area of HO_ODU3 is shifted to the 33th column through the 3840th column by the frame format conversion unit 44. The 17th column of the first and third rows are shifted by 16 bytes, and therefore the HO_ODU3 overhead of the second and fourth rows are shifted to the 17th column through the 32th column by 16 bytes. Furthermore, the frame format conversion unit 44 outputs payload enable signals indicating the payload area of HO_ODU3, together with Ext.HO_ODUk frame signals.

Instead of shifting the 17th column of the first and third rows by 16 bytes, it is possible to shift the 17th column of the first and fourth rows by 16 bytes. The shift amount of the 17th column of the first and third rows is not limited to 16 bytes; the shift amount may be set within a range of 16+32×n (n=0 ... 7).

The Ext.HO_ODUk frame and the payload enable signal output from the frame format conversion unit 44 are supplied to the demultiplexer 45 that performs a demultiplexing process in units of bytes.

The output parallel number of the demultiplexer 45 basically matches the number of tributary slots 'ts' (ts=32 in HO_ODU3) assigned to the payload area of HO_ODUk. Accordingly, signals of the same tributary slot numbers and accompanying overhead (OH), forward error correction (FEC) and null data '0' in the payload area of HO_ODUk are output to the byte data columns that are output from the output port of the demultiplexer 45. That is to say, a signal (TS#1) of a tributary slot number 1 is output from a first output port, a signal (TS#2) of a tributary slot number 2 is output from a second output port, and similarly, a signal (TS#32) of a tributary slot number 32 is output from a 32nd output port.

Figure 8D:
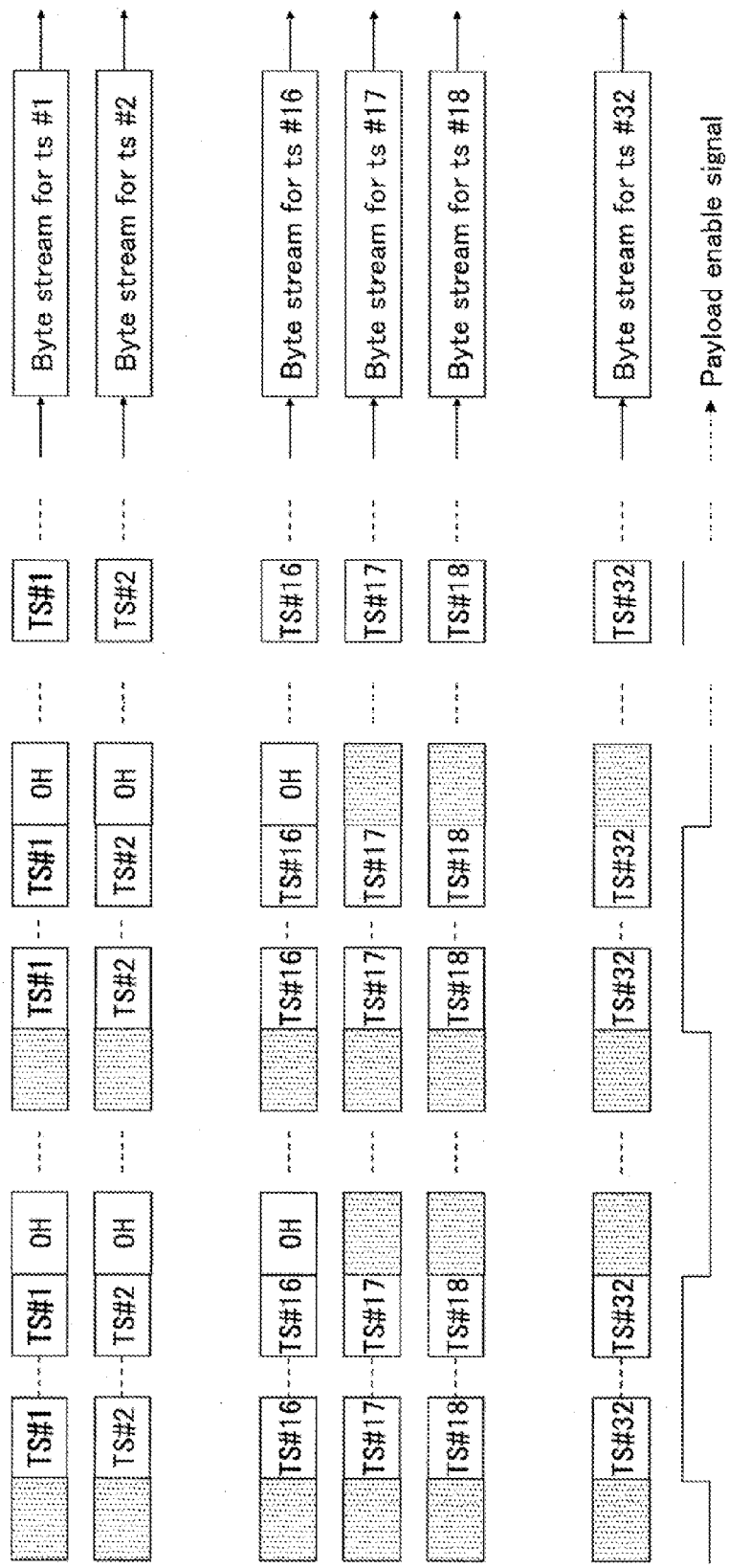

Payload enable signals indicating the tributary slot positions, are output in the respective byte data columns which are output from the output ports of the demultiplexer 45. FIG. 8D illustrates examples of byte data columns and payload enable signals of the tributary slot numbers #1 through #32 output from the respective output ports of the demultiplexer 45 that operates based on OTU3 clocks.

The byte data columns and payload enable signals of the respective tributary slots output from the demultiplexer 45 are supplied to the demapping units 46-1 through 46-n, and ODUj signals are extracted from the byte data columns.

FIG. 9 illustrates a configuration of the demapping units 46-1 through 46-n according to one embodiment. At the output part of the demultiplexer 45, FIFO 51-1 through 51-n are provided for the respective tributary slots #01 through #n. The operations of writing into the FIFO 51-1 through 51-n are controlled by write enable signals that are output from a stuff control unit 52 and that operate based on OTUk clocks. Furthermore, read out operations from the FIFO 51-1 through 51-n are controlled by using the ODUj clocks, which are reproduced from the write enable signals, as read enable signals.

In the stuff control unit 52, Justification Control (JC) byte information is input from JC byte processing units 53-1 through 53-n, which terminate the overhead (OH) storing data or stuff information of the respective tributary slots. The JC byte information is input from the frame format conversion unit 44 or the demultiplexer 45. AMP control units (AMPcnt) 54-1 through 54-n and GMP control units (GMPcnt) 55-1 through 55-n in the stuff control unit 52 determine the position of data or stuff in the byte data columns of the respective tributary slots of the AMP method and the GMP method, based on the JC byte information. According to the determination results, the AMP control units (AMPcnt) 54-1 through 54-n and GMP control units (GMPcnt) 55-1 through 55-n generate write enable signals for writing into the FIFO 51-1 through 51-n. That is to say, the write enable signals are generated for instructing to write data in byte data columns into the FIFO for the respective tributary slots, and for instructing not to write stuff bytes into the FIFO and deleting the stuff bytes.

Selectors 56-1 through 56-n are provided for the purpose of selecting a write enable signal of the AMP method corresponding to the minimum tributary slot number, in order to operate multi-frames in connection with each other, when there are multi-frames including two or more occupied tributary slots M. Furthermore, selectors 57-1 through 57-n are provided for the purpose of selecting a write enable signal of the GMP method corresponding to the minimum tributary slot number, in order to operate multi-frames in connection with each other, when there are multi-frames including two or more occupied tributary slots M. Furthermore, selectors 58-1 through 58-n are provided for the purpose of selecting either the AMP method or the GMP method for implementing FIFO control. This selection is determined in advance. According to write enable signals output from the selectors 58-1 through 58-n, the operation of writing into FIFO 51-1 through 51-n is controlled.

In FIG. 7, the clock reproduction units 47-1 through 47-n uses write enable signals supplied from the demapping units 46-1 through 46-n and HO_ODUk clocks supplied from the clock reproduction unit 42, to reproduce ODUj clocks when write enable signals instruct writing, and supplies the ODUj clocks to the ODUj processing units 48-1 through 48-n. The ODUj processing units 48-1 through 48-n attaches overheads to the ODUj signals supplied from the demapping units 46-1 through 46-n, and outputs the ODUj signals to the client side or the cross-connect side, with the use of ODUj clocks supplied from the clock reproduction units 47-1 through 47-n. The clock reproduction units 47-1 through 47-n are based on the clocks output from the clock reproduction unit 42, and therefore the ODUj frames output from the ODUj processing units 48-1 through 48-n are synchronized.

As described above, when ODUj is extracted from OTUk, a byte data column is generated for each tributary slot, the position of data or stuff of the AMP method of the GMP method in the generated byte data column is determined, and ODUj is extracted with the use of the determination result. Accordingly, a shared circuit can be used both in the AMP method and the GMP method, except for the control unit for determining the position of the data or stuff of the AMP method or the GMP method.

Multiplexing Block

The multiplexing block 60 illustrated in FIG. 7 performs operations that are substantially opposite to those of the demultiplexing block 40. The multiplexing block 60 includes ODUj processing units 61-1 through 61-n, mapping units of AMP method and GMP method 62-1 through 62-n, clock generating units 63-1 through 63-n, a multiplexer 64 that operates based on OTUk clocks, a frame format inverse conversion unit 65 that operates based on OTUk clocks, an Ext-.HO_ODUk processing unit 66 that operates based on OTUk clocks, an OTUk processing unit 67, and a clock reproducing unit 68.

The ODUj frames received from the client side or the cross-connect side are subjected to processing on the overheads at the ODUj processing units 61-1 through 61-n that operate based on ODUj clocks from the clock generating units 63-1 through 63-n. Upon aligning the front positions of the ODUj frames, the ODUj frames are supplied to the mapping units 62-1 through 62-n. At the mapping units 62-1 through 62-n, the ODUj frames are mapped in byte data columns corresponding to the tributary slots. The byte data columns are turned into converted frames by being multiplexed in units of bytes at the multiplexer 64 that operates based on OTUk clocks from the clock reproducing unit 68.

Next, the converted frames are further converted into Ext-.HO_ODUk frames at the frame format inverse conversion unit 65 that operates based on OTUk clocks. The Ext-.HO_ODUk processing unit 66 that operates based on OTUk clocks converts the Ext.HO_ODUk frame into a HO_ODUk frame. The OTUk processing unit 67 generates an OTUk frame by attaching overhead information and FEC overhead information to the HO_ODUk frame, and outputting the OTUk to the network side.

Figure 10:
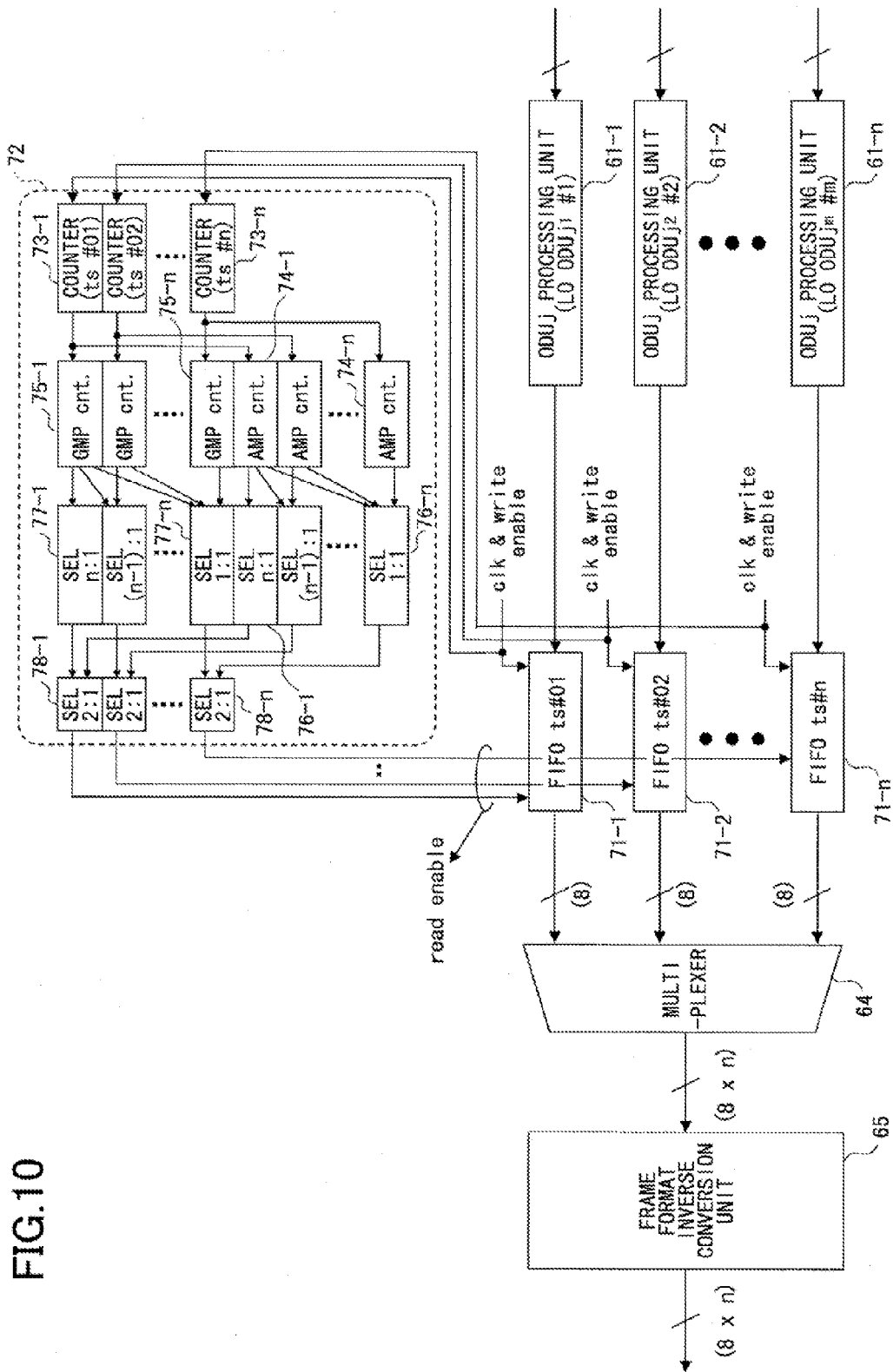
FIG. 10 illustrates mapping units according to one embodiment.

FIG. 10 illustrates a configuration of the mapping units 62-1 through 62-$n$ according to one embodiment. In FIG. 10, the ODUj signals output from the ODUj processing units 61-1 through 61-$n$ are supplied to FIFO 71-1 through 71-$n$ of the mapping units 62-1 through 62-$n$. The operations of writing into the FIFO 71-1 through 71-$n$ are controlled by clocks and write enable signals corresponding to ODUj signals. The clocks and write enable signals correspond to ODUj clocks output from the clock reproduction units 47-1 through 47-$n$ of the demultiplexing block 40. The clocks and write enable signals corresponding to ODUj signals are supplied to and counted at counters 73-1 through 73-$n$ provided for the respective tributary slot numbers in a stuff control unit 72.

The count values counted at the counters 73-1 through 73-$n$, i.e., the number of bytes of the data of the ODUj signals, are supplied to AMP control units (AMPcnt) 74-1 through 74-$n$ and GMP control units (GMPcnt) 75-1 through 75-$n$. The AMP control units (AMPcnt) 74-1 through 74-$n$ and the GMP control units (GMPcnt) 75-1 through 75-$n$ determine, for each of the tributary slots, whether the count value is the stuff byte position to be inserted into the byte data column set in advance. According to the determination results, the AMP control units (AMPcnt) 74-1 through 74-$n$ and the GMP control units (GMPcnt) 75-1 through 75-$n$ generate read enable signals for writing into the FIFO 71-1 through 71-$n$. That is to say, the read enable signals are generated for instructing to read data from the FIFO of the data in the byte data columns for the respective tributary slots, and for instructing not to read data from the FIFO at the stuff byte positions and for inserting stuff bytes.

Selectors 76-1 through 76-$n$ are provided for the purpose of selecting a read enable signal of the AMP method corresponding to the minimum tributary slot number, in order to operate multi-frames in connection with each other, when there are multi-frames including two or more occupied tributary slots M. Furthermore, selectors 77-1 through 77-$n$ are provided for the purpose of selecting a read enable signal of the GMP method corresponding to the minimum tributary slot number, in order to operate multi-frames in connection with each other, when there are multi-frames including two or more occupied tributary slots M.

Furthermore, selectors 78-1 through 78-$n$ are provided for the purpose of selecting either one of the AMP method or the GMP method for implementing FIFO control. According to read enable signals output from the selectors 78-1 through 78-$n$, the operation of reading from FIFO 71-1 through 71-$n$ is controlled.

Frame Format Conversion Unit

Next, a detailed description is given of the frame format conversion unit 44. The main purpose of the frame format conversion unit 44 is as follows. With respect to the Ext.HO_ODUk frame that operates based on OTUk clocks as described above, the HO_ODUk overhead and payload are moved to the invalid data area of the Ext.HO_ODUk frame. Accordingly, frame format conversion is performed to attain byte columns in units of tributary slots after the demultiplexer 45 performs processing in units of bytes. The following is a list of frame format conversion functions.

(1) Rearrangement of tributary slots in OPUk payload area of Ext.HO_ODUk: perform format conversion on Ext.HO_ODUk frame to attain byte columns in units of tributary slots after the demultiplexer 45 performs processing in units of bytes.

(2) Generate payload enable signals: generate enable signals indicating the OPUk payload area in Ext.HO_ODUk.

(3) Rearrangement of OPUk overhead: When demultiplexing/multiplexing processes are performed on ODUj from HO_ODUk, processing is performed based on JC byte information of the OPUk overhead. The OPUk overhead is rearranged so that the JC byte information is included in the byte data columns in units of tributary slots.

(4) Generate JC enable signals: Generate JC enable signals indicating the positions of the JC byte information.

Example of Frame Format Conversion

Next, a description is given of an example of tributary slot rearrangement, in a case of performing frame format conversion on OTU3, HO_ODU3, and Ext.HO_ODU3 signals.

First, a description is given of frame format conversion functions (1) and (2). In OTU3, HO_ODU3, and Ext.HO_ODU3 signals, assuming that the tributary slots have a bandwidth of approximately 1.25 Gbit/s, the number of tributary slots ts is 32. Therefore, the number of output ports of the demultiplexer 45 is 32 ports, and 32 byte data columns are output.

When frame format conversion is not performed, as illustrated in FIG. 11(A), the ODU3 overheads and ODU3 payloads per row of the ODU3 are not an integral multiple of 32. Therefore, from the output ports of the demultiplexer 13 corresponding to the respective bytes of the 32 byte width, the data items output for the respective rows of the ODU3 frame have different tributary slot numbers. Furthermore, when port numbers are assigned from 1 to 32 from the top to bottom output ports of the demultiplexer 13, the port numbers and the tributary slot numbers do not match. In this state, when the process of the payload area of HO_ODUk is to be implemented in units of tributary slots, a process of switching the tributary slots to the output side of the demultiplexer 13 is needed.

Next, a description is given of a case of performing frame format conversion. In the processing of OTU3 frames and Ext.HO_ODU3 frames that operate based on OTU3 clocks, the overhead areas of OTU3 and HO_ODU3, and the FEC overhead areas of OTU3 may be blank areas. Thus, by using these blank areas, the tributary slots are rearranged in the HO_ODU3 payload area at the demultiplexer 45. In the case of FIG. 11(A), where frame format conversion is not performed, the tributary slots TS#1 through TS#16 are arranged subsequent to the overhead area, in the first column of the first row in the HO_ODU3 frame.

Meanwhile, in the case of FIG. 11(B) where frame format conversion is performed, 16 bytes of invalid data (null, all '0') are stored subsequent to the overhead area, in the first column of the first row in the Ext.HO_ODU3 frame. From the second column onward, TS#1 through TS#32 are arranged. The process of inserting 16 bytes of invalid data is implemented by delaying 16 bytes of data beyond the overhead area of the Ext.HO_ODU3 frame.

In this case, in the output from the demultiplexer 45 in units of bytes, all payload areas TS#1 through TS#32 of the Ext.HO_ODU3 frame are output based on the same clock. Therefore, the payload enable signals, for indicating the payload part of Ext.HO_ODU3, are also generated. By implementing the above-described frame conversion to the Ext.HO_ODU3 frame, the output port numbers and the TS numbers of the demultiplexer 45 match, and the multiplexing process/demultiplexing process of ODUj signals to HO_ODU3 can be implemented in units of tributary slots.

Next, a description is given of frame format conversion functions (3) and (4). The background of requesting these functions is described below.

When performing the multiplexing process/demultiplexing process of ODUj from HO_ODUk, the process is performed in units of tributary slots. Furthermore, at this time, a stuff process is performed based on JC byte information stored in the OPUk overheads positioned at the 15th and 16th columns of HO_ODUk. Thus, it is easy to perform the JC byte overhead process if JC byte information of the OPUk overhead is included in the byte data column of every tributary slot. For example, JC bytes can be supplied from the respective output ports of the demultiplexer 45 to the JC byte processing units 53-1 through 53-n of the demapping units 46-1 through 46-n in FIG. 9.

In consideration of the multiplexing process/demultiplexing process of ODUj from HO_ODUk by the AMP method, the data, which is stored in the Negative Justification Opportunity (NJO) byte that is fixed in the OPUk overhead part (fixed in the 4th column and 16th column of the HO_ODUk frame), becomes the NJO byte area corresponding to TS#1 through TS#32 for each frame, in the case of HO_ODU3. This data appears at an output port (here, it is assumed as TS#N) of the demultiplexer 45 corresponding to a particular tributary slot. For this reason, in order to process the NJO bytes corresponding to the data of an arbitrary tributary slot #i, the output port needs to be switched to the output port corresponding to the tributary slot (TS#N) at the fixed position where NJO appears. In order to eliminate the need of this switching, frame conversion is performed so that the data appears at the output ports of the demultiplexer 45 to which the NJO bytes of the respective tributary slots correspond.

Figure 12A:
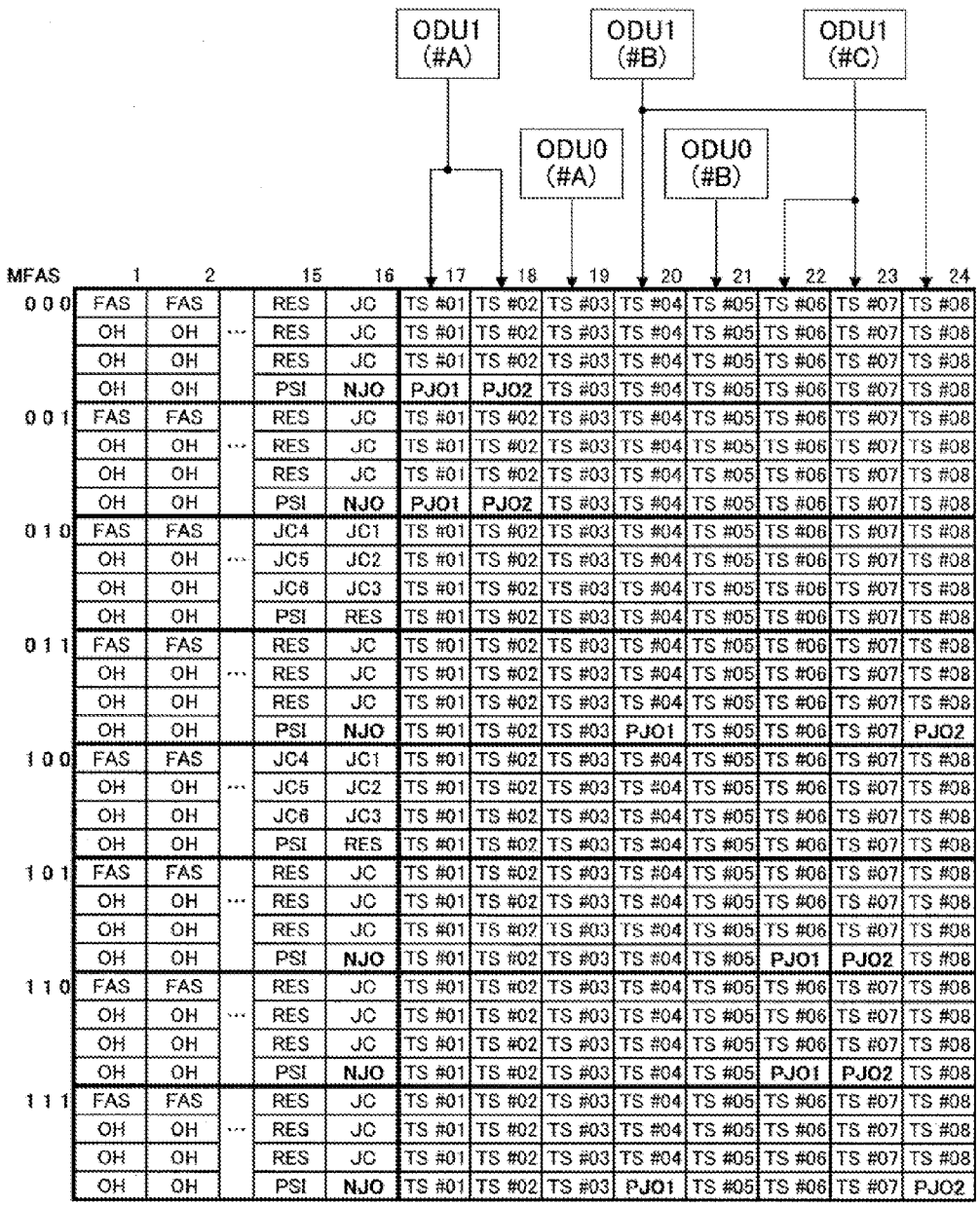
Figure 12E:
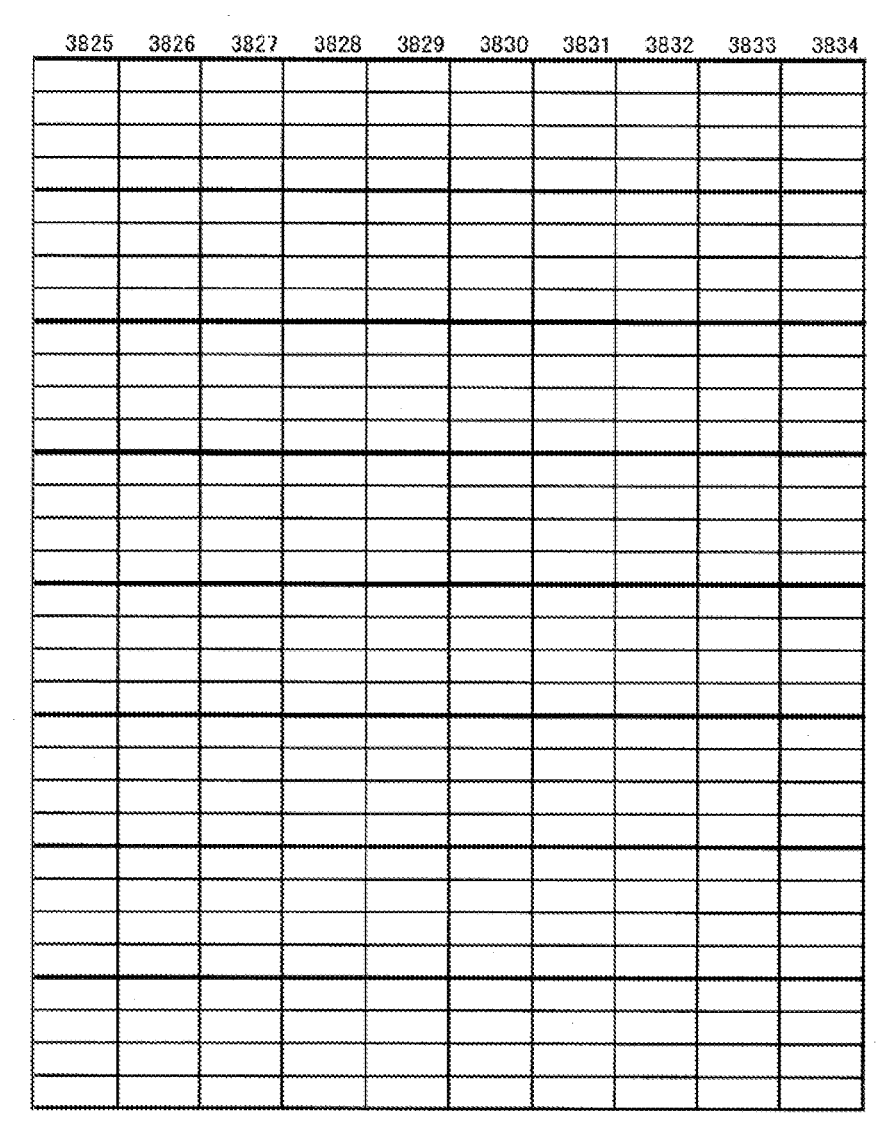
Figure 12F:
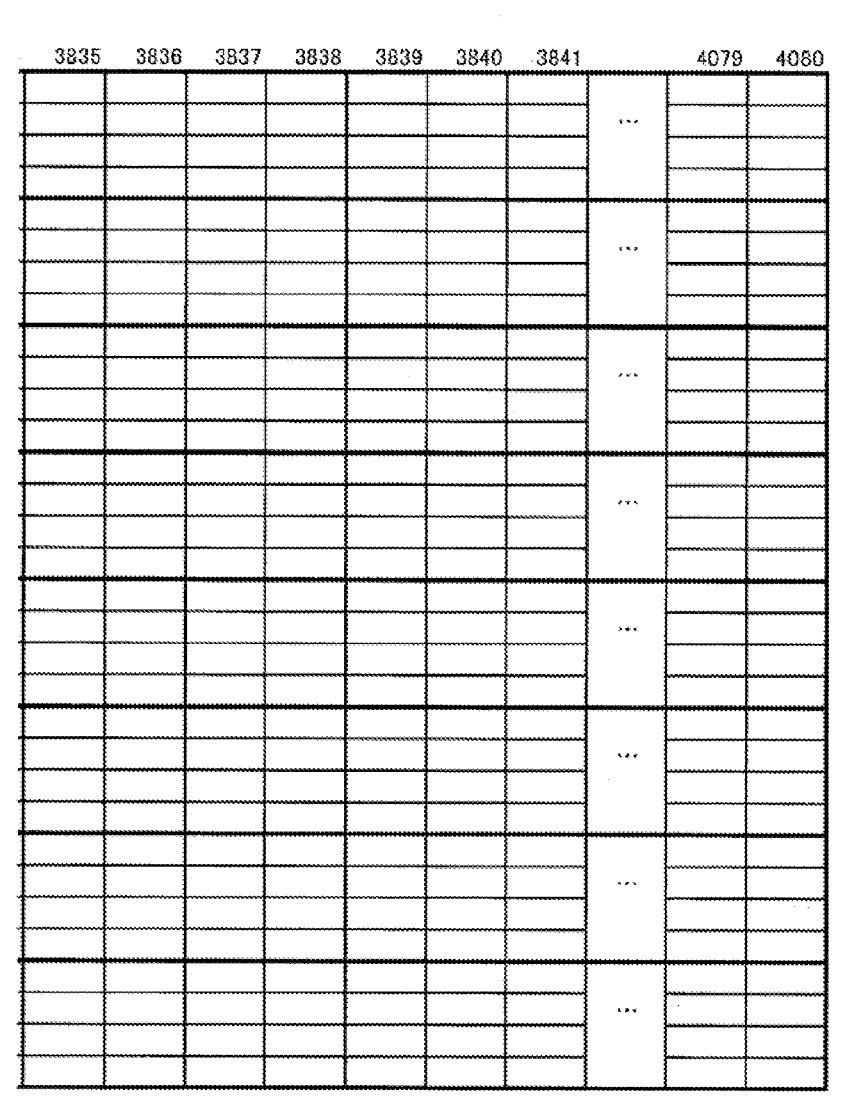
Figure 13B:
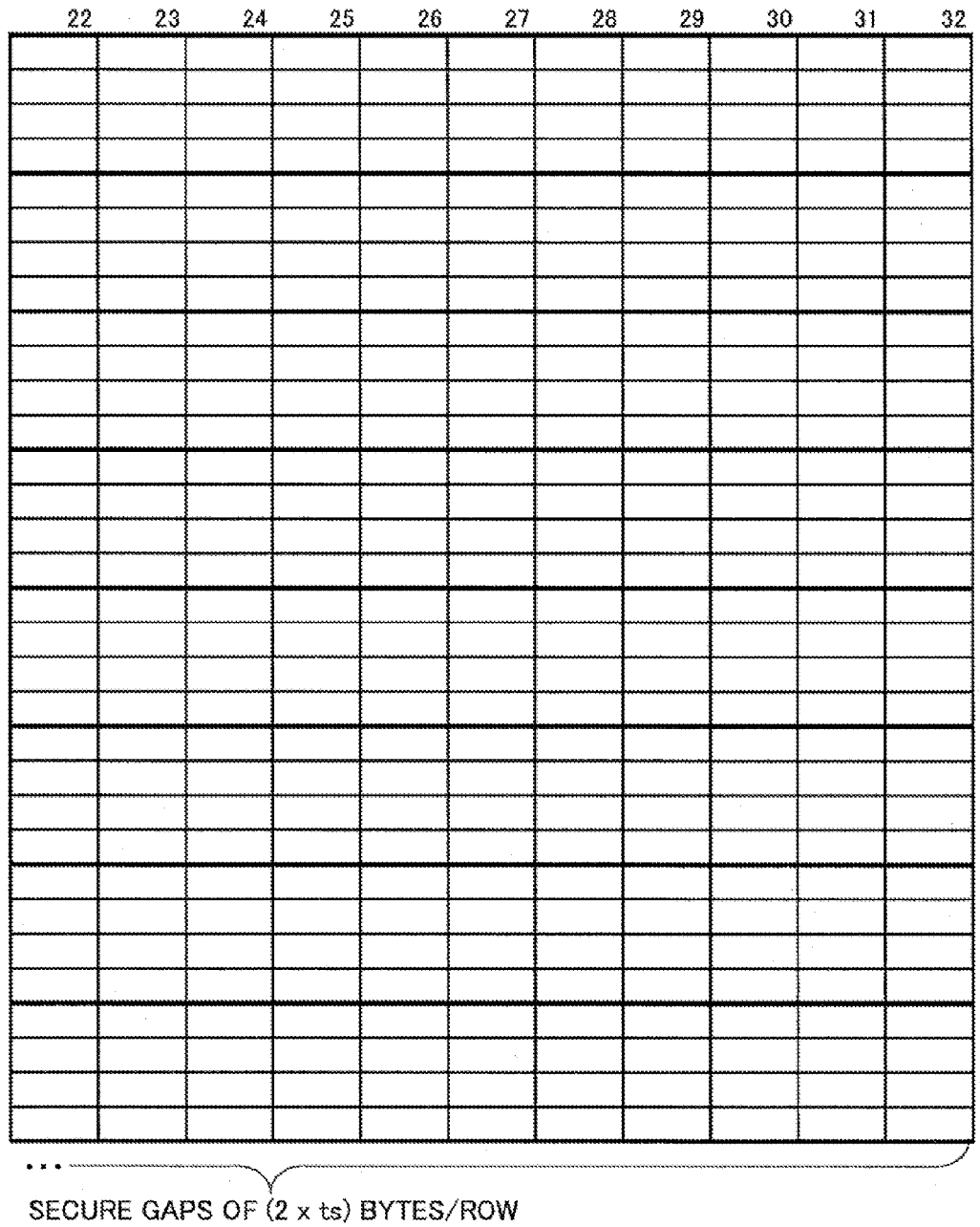

A description is given of an overview of rearranging OPUk overheads, taking as an example the case where OTU2/HO_ODU2 (Ext.HO_ODU2) has tributary slots having a bandwidth of approximately 1.25 Gbps. FIGS. 12A through 12F illustrate the arrangement of tributary slots of an OTU2 frame, in which 2×ODU0 and 3×ODU1 are multiplexed in Ext.HO_ODU2 before frame format conversion. FIG. 12B is continued from the right side of FIG. 12A, FIG. 12C is continued from the right side of FIG. 12B, FIG. 12D is continued from the right side of FIG. 12C, FIG. 12E is continued from the right side of FIG. 12D, and FIG. 12F is continued from the right side of FIG. 12E. The same applies to FIGS. 13A through 13F and FIGS. 14A through 14F.

The OTU2 frame before frame format conversion in FIGS. 12A through 12F is an OTU2 frame that is one multi-frame constituted by eight OTU2 frames. Specifically, ODU1 (#A) is assigned to TS#1 and TS#2, ODU0 (#A) is assigned to TS#3, ODU1 (#B) is assigned to TS#4 and TS#8, ODU0 (#B) is assigned to TS#5, and ODU1 (#C) is assigned to TS#6 and TS#7. That is to say, in the overhead (1st through 6th columns) of the multi-frame, the 1st through 4th rows and the 5th through 8th rows indicate information (AMP) of ODU1 (#A), the 9th through 12th rows indicate information (GMP) of ODU0 (#A), the 13th through 16th rows and the 29th through 32nd rows indicate information (AMP) of ODU1 (#B), the 17th through 20th rows indicate information (GMP) of ODU0 (#B), and the 21st through 24th rows and the 25th through 28th rows indicate information (AMP) of ODU1 (#B).

In FIGS. 13A through 13F, at the boundary part between the OPUk overhead (16th column) and the payload area (17$^{th}$ column), gap areas are secured for copying the information in the OPUk overhead to the respective tributary slots. In this example, a gap area is inserted in each row, such that (the amount of overhead information in which signal storage information is stored [byte/row])×(number of tributary slots 'ts' [row]). That is to say, in the 9th row expressing the GMP method in FIG. 13A, the amount of overhead information storing the signal storage information (JC1, JC2) at the 15th column and the 16th column is two bytes. In the 10th row, the amount of overhead information storing the signal storage information (JC3, JC4) is two bytes. Furthermore, ts=2, and therefore a gap corresponding to 2 [byte/row]×8 [row]=16 bytes is secured in each row. By inserting these gaps, the payload area shifts in the time axis direction, but this shift amount is absorbed in the FEC overhead area of Ext.HO_ODU2.

Next, as indicated in FIGS. 14A through 14F after frame format conversion, the OPUk overheads are copied to the gap areas. The 15th column of the OPUk overhead is copied to the 17th through 24th columns by only 8 TS, and subsequently, the 16th column of the OPUk overhead is copied to the 25th through 32nd columns by only 8 TS. At this time, JC enable signals indicating JC and the positions of JC1 through JC6 bytes are also generated.

Figure 15B:
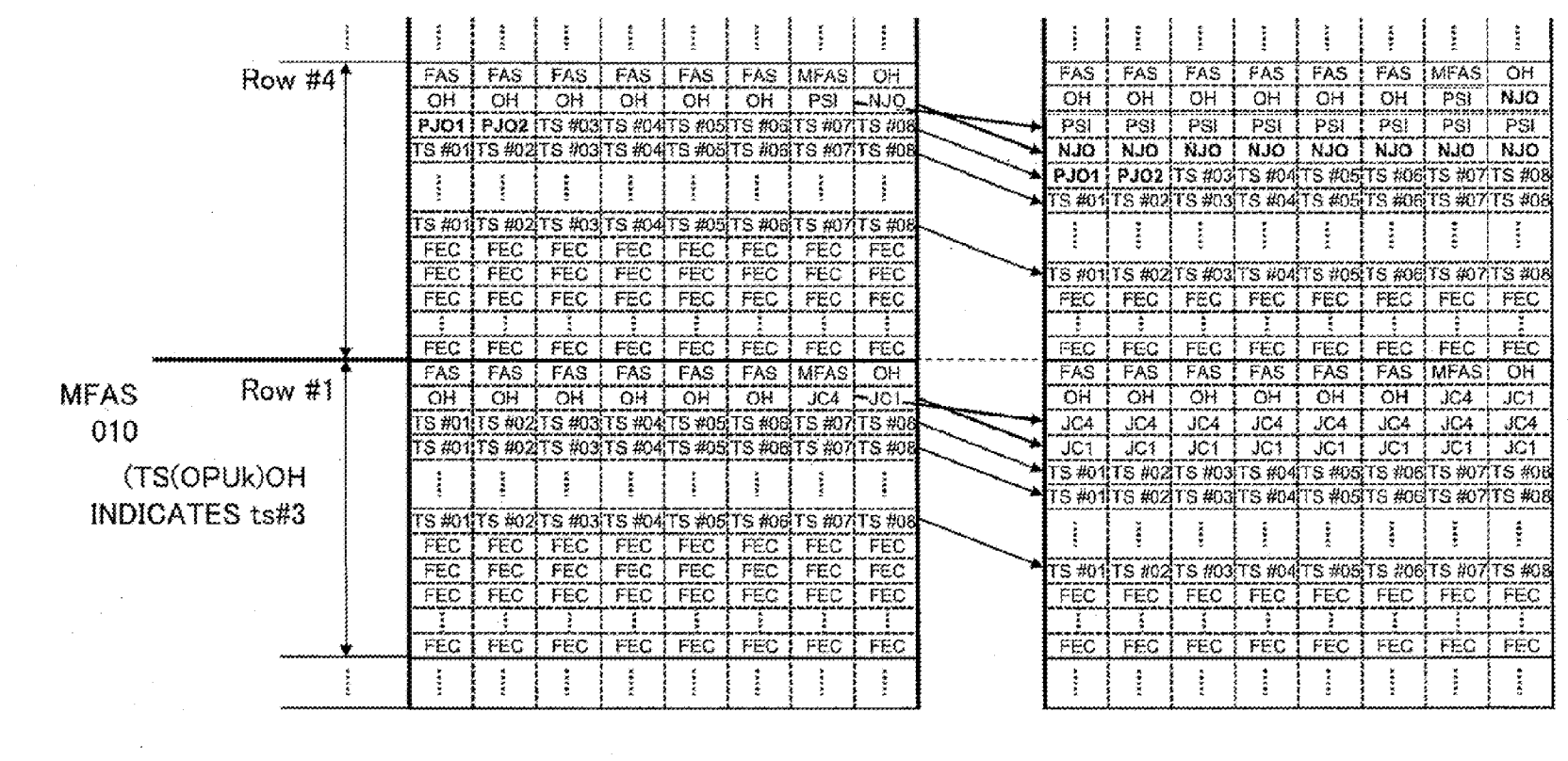

FIGS. 15A and 15B illustrate an Ext.HO_ODU2 frame configuration, in which the OTU2 frames indicated in FIGS. 12A through 14F are arranged in parallel with a width of eight bytes. The left side of FIGS. 15A and 15B indicates the frames before undergoing frame format conversion indicated in FIGS. 12A through 12F arranged in parallel with a width of eight bytes. The right side of FIGS. 15A and 15B indicates the converted frames that have undergone frame format conversion indicated in FIGS. 14A through 14F arranged in parallel with a width of eight bytes. In FIGS. 15A and 15B, the horizontal direction indicates the respective channels for eight bytes arranged in parallel, and the vertical direction indicates the arrangement of data in the direction of time.

On the right side of FIGS. 15A and 15B, the OPU2 overheads are arranged so that they appear in columns corresponding to the respective tributary slots. The operation of extracting data from the respective tributary slots of HO_ODU2 by the AMP method or the GMP method is implemented as follows. That is, at the timings when the OPU2 overheads are stored in the respective tributary slots to which the demapping units 46-1 through 46-n correspond, the OPU2 overhead information is extracted and control is implemented by the AMP method or the GMP method. The above timings may be extracted by a monitor of the Multi Frame Alignment (MFAS) overhead in the case of OTU1, 2, 3, and may be extracted by a monitor of the OPU Multi-Frame Identifier (OMFI) overhead in the case of OTU4.

Figure 16B:
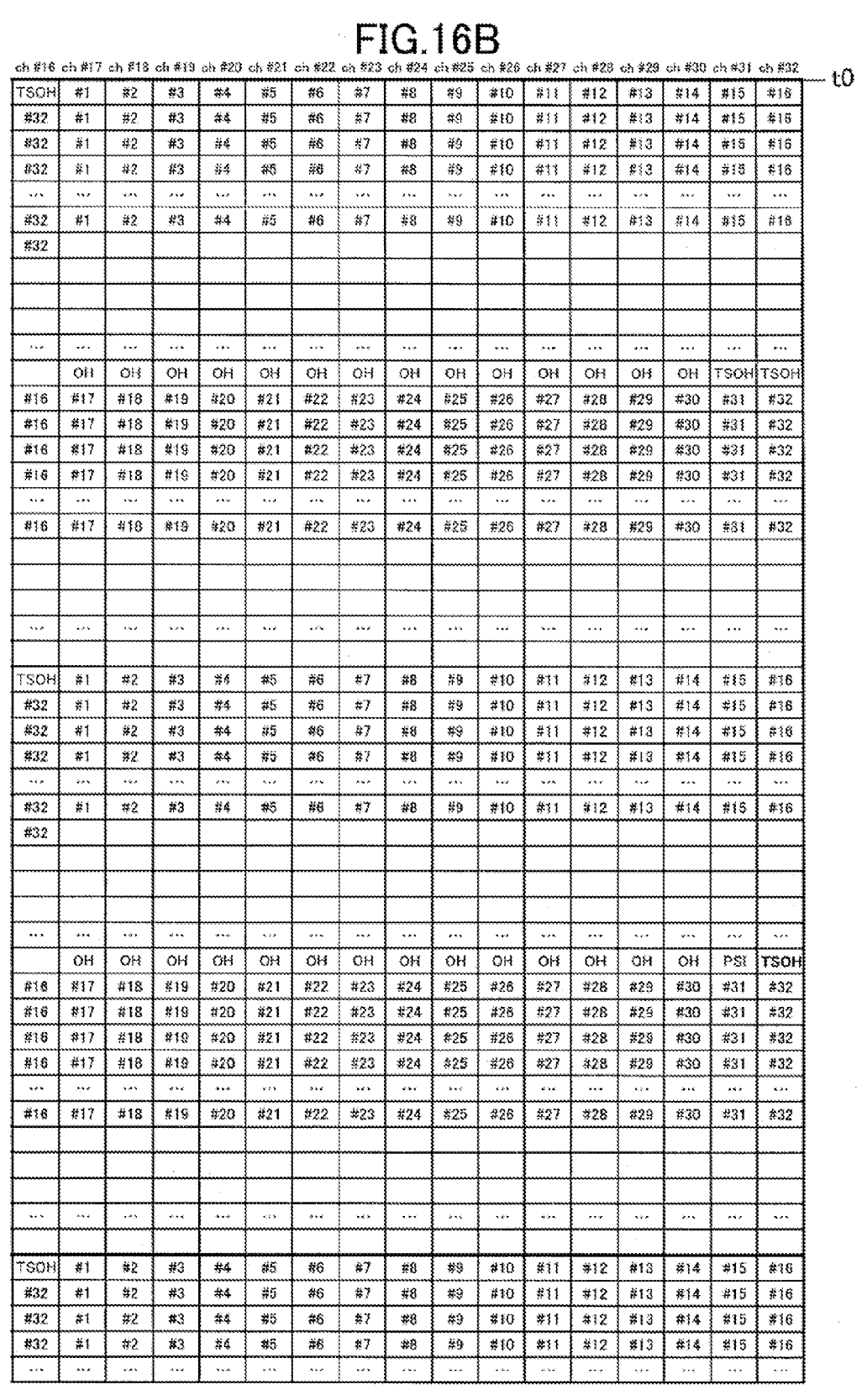

FIGS. 16A through 16F illustrate an Ext.HO_ODU3 frame configuration, in which the OTU3 frames are arranged in parallel with a width of 32 bytes. FIGS. 16A and 16B indicate a frame before undergoing frame format conversion arranged in parallel with a width of 32 bytes. FIGS. 16C and 16D indicate a converted frame that has undergone frame format conversion by the frame format conversion unit 44, arranged in parallel with a width of 32 bytes. FIGS. 16E and 16F indicate a frame that has undergone inverse frame format conversion by the frame format inverse conversion unit 65, arranged in parallel with a width of 32 bytes. In FIGS. 16A through 16F, the horizontal direction indicates the respective channels of eight bytes arranged in parallel, and the vertical direction indicates the arrangement of data in the direction of time. Furthermore, the start timing t0 of the OTU3 frame in FIGS. 16A and 16B is also indicated in the frames of FIGS. 16C and 16D and FIGS. 16E and 16F.

In FIGS. 16C and 16D, the OPU3 overheads are arranged so that they appear in columns corresponding to the respective tributary slots. The operation of extracting data from the respective tributary slots of HO_ODU3 by the AMP method or the GMP method is implemented as follows. That is, at the timings when the OPU3 overheads are stored in the respective tributary slots to which the demapping units 46-1 through 46-n correspond, the OPU3 overhead information is extracted and control is implemented by the AMP method or the GMP method. Furthermore, the frame that has undergone inverse frame format conversion indicated in FIGS. 16E and 16F is the same as the frame before undergoing frame format conversion indicated in FIGS. 16A and 16B.

Figure 17:
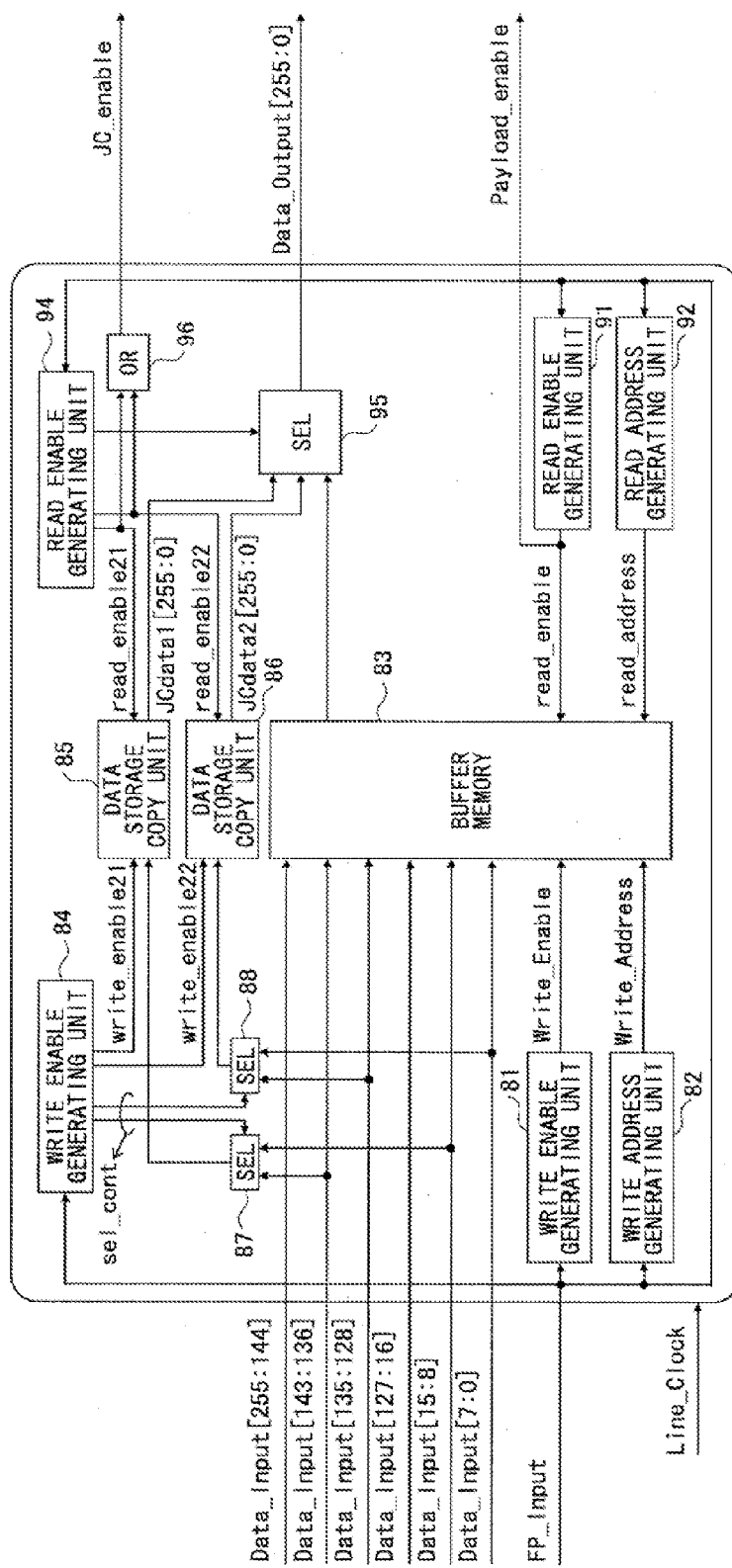
FIG. 17 illustrates a configuration of a frame format conversion unit according to one embodiment.
Figure 18:
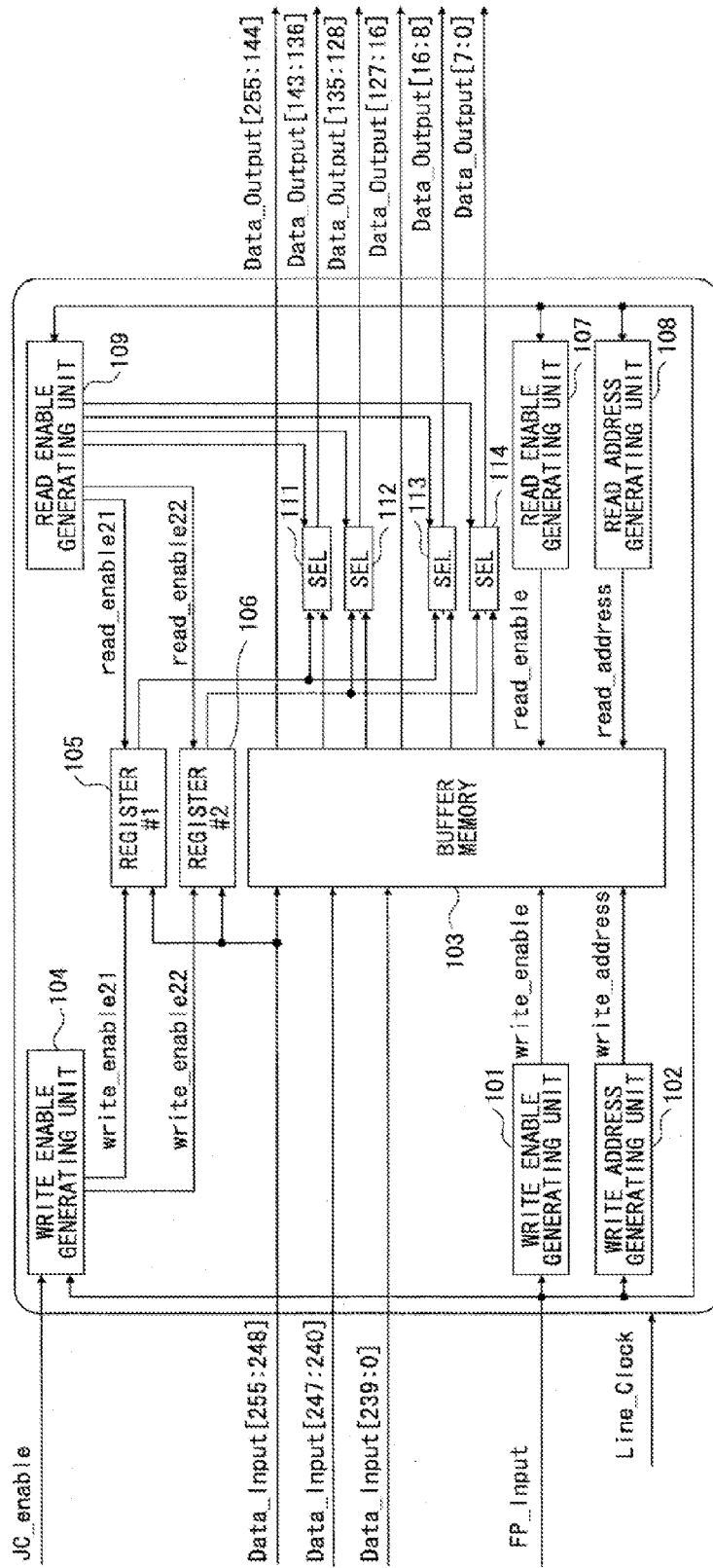
FIG. 18 illustrates a configuration of a frame format inverse conversion unit according to one embodiment.

FIG. 17 illustrates a configuration of the frame format conversion unit 44 according to one embodiment, and FIG. 18 illustrates a configuration of the frame format inverse conversion unit 65 according to one embodiment. In FIGS. 17 and 18, Ext.HO_ODU3 frames operating by OTU3 clocks are the targets of conversion, and it is assumed that the Ext.HO_ODU3 frames are input and output based on parallel signals having a width of 32 bytes (a width of 256 bits).

In FIG. 17, the input data having a width of 256 bits is expressed by Data_Input[x:y] (x indicating the end bit position and y indicating the start bit position). This input data is, for example, the data indicated in FIGS. 16A and 16B. Furthermore, a frame pulse (FP_Input) indicating the beginning of the Ext.HO_ODU3 frame is input.

The signals of the payload area of Ext.HO_ODU3 are written into a buffer memory 83 in accordance with write enable signals (write_enable) and write addresses (write_address) which are generated in synchronization with frame pulses at a write enable generating unit 81 and a write address generating unit 82.

The Justification Control (JC) overhead bytes (JC bytes) located in the 15th and 16th columns in the rows of Ext.HO_ODU3 are written into a data storage copy unit 85 and a data storage copy unit 86, in accordance with write enable signals (write_enable21, write_enable22) generated at a write enable generating unit 84. The JC byte in the 15th column of Ext.HO_ODU3 is written into the data storage copy unit 85, and the JC byte in the 16th column of Ext.HO_ODU3 is written into the data storage copy unit 86.

In the Ext.HO_ODU3 frame having a width of 256 bits, the positions where the signals of the 15th and 16th columns appear change in the respective rows of the Ext.HO_ODU3 frame. Specifically, in the first and third rows of the Ext.HO_ODU3 frame, the JC byte of the 15th column appears at Data_input[143:136], and the JC byte of the 16th column appears at Data_input[135:128]. Furthermore, in the second and fourth rows of the Ext.HO_ODU3 frame, the JC byte of the 15th column appears at Data_input[15:8], and the JC byte of the 16th column appears at Data_input[7:0].

Thus, selectors (SEL) 87 and 88 located at the former stages of the data storage copy unit 85 and the data storage copy unit 86 are controlled with control signals generated at the write enable generating unit 84. Accordingly, for the respective rows of the Ext.HO_ODU3 frame, either one of Data_input[143:136] or Data_input[15:8] is selected for the JC byte of the 15th column, and either one of Data_input[135:128] or Data_input[7:0] is selected for the JC byte of the 16th column. In the data storage copy units 85 and 86, 32 JC bytes of information are duplicated and stored, to output a total of 256 bits (32×8 bits) of the JC byte information input in units of bytes.

At the output side of the frame format conversion unit 44, data is read from the buffer memory 83 so that the information in the tributary areas included in the signals of the payload area of Ext.HO_ODU3 are output to a particular position of Data_Output[255:0]. Specifically, the data is read out from the buffer memory 83 according to read enable signals (read_enable) and read addresses (read_address) generated in synchronization with frame pulses at a read enable generating unit 91 and a read address generating unit 92.

At the output side, data columns are output in the following manner. Specifically, the tributary slot number #01 is output to Data_Output[255:248], the tributary slot number #02 is output to the Data_Output[247:240], . . . , the tributary slot number #32 is output to the Data_Output[7:0]. The output data is the converted frame as indicated in FIGS. 16C and 16D, for example. At this time, payload enable signals (Payload_enable) are also output, which indicate that signals of the payload part of Ext.HO_ODU generated at the read enable generating unit 91 are output.

The JC byte information stored in the data storage copy units 85 and 86 is respectively read by the read enable signals (read_enable21, read_enable22) generated at a read enable generating unit 94. Furthermore, the JC byte information is output from Data_Output[255:0] according to control signals of a selector 95 located in Data_Output[255:0]. At this time, a JC enable signal (JC_enable) indicating the JC byte information position generated at the read enable generating unit 94 is also output through an OR circuit 96.

The frame format inverse conversion unit 65 illustrated in FIG. 18 performs inverse conversion on the Ext.HO_ODU3 that has been converted at the frame format conversion unit 44 illustrated in FIG. 17. Input data Data_Input[x:y] having a width of 256 bits that has undergone frame format conversion is input. This input data is, for example, the converted frame illustrated in FIGS. 16C and 16D. Furthermore, a frame pulse (FP_Input) indicating the front edges of the Ext.HO_ODU3 frame that has undergone frame format conversion, and a JC_enable signal indicating the position of the JC byte in the Ext.HO_ODU3 frame that has undergone frame format conversion are input.

The Ext.HO_ODU3 signals that have undergone frame format conversion are written into a buffer memory 103 in accordance with write enable signals (write_enable) and write addresses (write_address) that are generated at a write enable generating unit 101 and a write address generating unit 102 in synchronization with frame pulses.

The JC byte information included in Ext.HO_ODU3 is written into registers 105 and 106 in accordance with write enable signals (write_enable21, write_enable22) generated at a write enable generating unit 104. In Ext.HO_ODU3 that has undergone frame format conversion, JC bytes appear in all 256 bits. As 32 JC bytes in units of 8 bytes have been duplicated in the 256 bits, the JC bytes are written into the registers 105 and 106 with the use of signals of Data_Input[255:248] that are the first 8 bits of Data_Input[x:y]. The Data_Input[x:y] positions connected to the registers 105 and 106 are not limited to the above.

At the output side of the frame format inverse conversion unit 65, data is read from the buffer memory 103 in accordance with read enable signals (read_enable) and read addresses (read_address) that are generated in synchronization with frame pulses at a read enable generating unit 107 and a read address generating unit 108 to be Ext.HO_ODU3 frames.

The JC byte information stored in the registers 105 and 106 is read out in accordance with read enable signals (read_enable21, read_enable22) generated at a read enable generating unit 109, and is supplied to selectors 111, 112, 113, and 114 located between the buffer memory 103 and Data_Output [143:136], Data_Output[135:128], Data_Output[16:8], and Data_Output[7:0]. The selectors 111 through 114 output the JC bytes so as to be located in the 15th and 16th columns of the Ext.HO_ODU3 frame, in accordance with control signals generated at the read enable generating unit 109. Accordingly, for example, the Ext.HO_ODU3 frame indicated in FIGS. 16E and 16F is output.

According to the present embodiment, the output port numbers and the TS numbers of the demultiplexer 45 are matched. Therefore, in the demapping units 46-1 through 46-*n*, elements such as the FIFO 51-1 through 51-*n* can be shared (by the AMP method and the GMP method), except for the AMP control units 54-1 through 54-n and the GMP control units 55-1 through 55-n. Furthermore, in the mapping units 62-1 through 62-n, elements such as the FIFO 71-1 through 71-n can be shared (by the AMP method and the GMP method), except for the AMP control units 74-1 through 74-n and the GMP control units 75-1 through 75-n. Thus, according to an embodiment of the present invention, demapping and mapping can be implemented by approximately half the scale size of the conventional technology.

According to an embodiment of the present invention, the circuit scale can be reduced.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A signal demultiplexer for demultiplexing plural low speed signal transfer frames from a signal storing area of a high speed signal transfer frame, the signal demultiplexer comprising:
    a terminating unit configured to terminate the high speed signal transfer frame, the high speed signal transfer frame including a first overhead area, the signal storing area, and a second overhead area, wherein a predetermined number of tributary slots for storing the plural low speed signal transfer frames are assigned to the signal storing area;
    a format conversion unit configured to convert a format of the high speed signal transfer frame output from the terminating unit into a format of a converted frame;
    a parallelization unit configured to parallelize the converted frame output from the format conversion unit into a number of data columns corresponding to the predetermined number, and to output the data columns; and
    a separating unit configured to separate the plural low speed signal transfer frames from the predetermined number of the data columns output from the parallelization unit, wherein
    the format conversion unit converts the format of the high speed signal transfer frame into the format of the converted frame by delaying the signal storing area of the high speed signal transfer frame using the first overhead area and the second overhead area, to include an "i" th tributary slot among the predetermined number of the tributary slots assigned to the signal storing area of the high speed signal transfer frame into an arbitrary "i" th data column among the predetermined number of the data columns created by parallelization of the high speed signal transfer frame, and to align front positions of the predetermined number of the data columns.

2. The signal demultiplexer according to claim 1, wherein
    the format conversion unit secures duplication areas into which signal storage information stored in the tributary slots corresponding to the first overhead area is to be duplicated, the duplication areas being secured at respective rows of the high speed signal transfer frame at a boundary part between the first overhead area and the signal storing area of the high speed signal transfer frame, the duplication areas being secured by shifting the signal storing area in a time axis direction by an amount of the signal storage information corresponding to a multiple of the predetermined number, and
    the signal storage information is duplicated into the duplication areas by a number of times corresponding to the predetermined number.

3. A signal multiplexer for multiplexing plural low speed signal transfer frames into a signal storing area of a high speed signal transfer frame, the signal multiplexer comprising:
    a mapping unit configured to map the plural low speed signal transfer frames into a predetermined number of data columns of the high speed signal transfer frame, the high speed signal transfer frame including a first overhead area, the signal storing area, and a second overhead area, wherein a number of tributary slots corresponding to the predetermined number for storing the plural low speed signal transfer frames are assigned to the signal storing area;
    a serializing unit configured to serialize the predetermined number of the data columns whose front positions are aligned, and output a converted frame in which an arbitrary "i" th data column among the predetermined number of the data columns is stored in an "i" th tributary slot among the predetermined number of the tributary slots assigned to the signal storing area of the high speed signal transfer frame;
    a format inverse conversion unit configured to inversely convert a format of the converted frame output from the serializing unit into a format of the high speed signal transfer frame; and
    a frame generating unit configured to generate the high speed signal transfer frame by adding the first overhead area and the second overhead area to the high speed signal transfer frame output from the format inverse conversion unit, wherein
    the format inverse conversion unit inversely converts the format of the converted frame into the format of the high speed signal transfer frame by removing a delay of the signal storing area using the first overhead area and the second overhead area of the high speed signal transfer frame in the converted frame.

4. The signal multiplexer according to claim 3, wherein
    the format inverse conversion unit removes duplication areas provided at a boundary part between the first overhead area and the signal storing area of the high speed signal transfer frame in the converted frame.

5. A signal multiplexer/demultiplexer for demultiplexing plural low speed signal transfer frames from a signal storing area of a high speed signal transfer frame, and for multiplexing the plural low speed signal transfer frames into the signal storing area of the high speed signal transfer frame, the signal multiplexer/demultiplexer comprising:
    a terminating unit configured to terminate the high speed signal transfer frame, the high speed signal transfer frame including a first overhead area, the signal storing area, and a second overhead area, wherein a predetermined number of tributary slots for storing the plural low speed signal transfer frames are assigned to the signal storing area;
    a format conversion unit configured to convert a format of the high speed signal transfer frame output from the terminating unit into a format of a converted frame;
    a parallelization unit configured to parallelize the converted frame output from the format conversion unit into a number of data columns corresponding to the predetermined number, and to output the data columns;

a separating unit configured to separate the plural low speed signal transfer frames from the predetermined number of the data columns output from the parallelization unit;

a mapping unit configured to map the plural low speed signal transfer frames into the predetermined number of data columns;

a serializing unit configured to serialize the predetermined number of the data columns whose front positions are aligned, and output a converted frame in which an arbitrary "i" th data column among the predetermined number of the data columns is stored in an "i" th tributary slot among the predetermined number of the tributary slots assigned to the signal storing area of the high speed signal transfer frame;

a format inverse conversion unit configured to inversely convert a format of the converted frame output from the serializing unit into a format of the high speed signal transfer frame; and a frame generating unit configured to generate the high speed signal transfer frame by adding the first overhead area and the second overhead area to the high speed signal transfer frame output from the format inverse conversion unit, wherein the format conversion unit converts the format of the high speed signal transfer frame into the format of the converted frame by delaying the signal storing area of the high speed signal transfer frame using the first overhead area and the second overhead area, to include an "i" th tributary slot among the predetermined number of the tributary slots assigned to the signal storing area of the high speed signal transfer frame into an arbitrary "i" th data column among the predetermined number of the data columns created by parallelization of the high speed signal transfer frame, and to align front positions of the predetermined number of the data columns, and the format inverse conversion unit inversely converts the format of the converted frame into the format of the high speed signal transfer frame by removing a delay of the signal storing area using the first overhead area and the second overhead area of the high speed signal transfer frame in the converted frame.

6. A signal demultiplexing method for demultiplexing plural low speed signal transfer frames from a signal storing area of a high speed signal transfer frame, the signal demultiplexing method comprising:

terminating the high speed signal transfer frame, the high speed signal transfer frame including a first overhead area, the signal storing area, and a second overhead area, wherein a predetermined number of tributary slots for storing the plural low speed signal transfer frames are assigned to the signal storing area;

converting a format of the high speed signal transfer frame that has been terminated into a format of a converted frame;

parallelization of the converted frame that has undergone format conversion into a number of data columns corresponding to the predetermined number, and outputting the data columns; and separating the plural low speed signal transfer frames from the predetermined number of the data columns that have been parallelized, wherein the converting of the format of the high speed signal transfer frame into the format of the converted frame includes delaying the signal storing area of the high speed signal transfer frame using the first overhead area and the second overhead area, to include an "i" th tributary slot among the predetermined number of the tributary slots assigned to the signal storing area of the high speed signal transfer frame into an arbitrary "i" th data column among the predetermined number of the data columns created by parallelization of the high speed signal transfer frame, and to align front positions of the predetermined number of the data columns.

7. A signal multiplexing method for multiplexing plural low speed signal transfer frames into a signal storing area of a high speed signal transfer frame, the signal multiplexing method comprising:

mapping the plural low speed signal transfer frames into a predetermined number of data columns of the high speed signal transfer frame, the high speed signal transfer frame including a first overhead area, the signal storing area, and a second overhead area, wherein a number of tributary slots corresponding to the predetermined number for storing the plural low speed signal transfer frames are assigned to the signal storing area;

serializing the predetermined number of the data columns whose front positions are aligned, and outputting a converted frame in which an arbitrary "i" th data column among the predetermined number of the data columns is stored in an "i" th tributary slot among the predetermined number of the tributary slots assigned to the signal storing area of the high speed signal transfer frame;

inversely converting a format of the converted frame into a format of the high speed signal transfer frame; and generating the high speed signal transfer frame by adding the first overhead area and the second overhead area to the high speed signal transfer frame that has undergone inverse conversion, wherein the inversely converting of the format of the converted frame into the format of the high speed signal transfer frame includes removing a delay of the signal storing area using the first overhead area and the second overhead area of the high speed signal transfer frame in the converted frame.

* * * * *